US008928647B2

(12) United States Patent
Yamamoto et al.

(10) Patent No.: US 8,928,647 B2

(45) Date of Patent: Jan. 6, 2015

(54) INVERTER CIRCUIT AND DISPLAY UNIT

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 516 days.

(21) Appl. No.: 13/406,064

(22) Filed: Feb. 27, 2012

(65) Prior Publication Data

US 2012/0223930 A1 Sep. 6, 2012

(30) Foreign Application Priority Data

Mar. 4, 2011 (JP) ................................ 2011-048321
Mar. 4, 2011 (JP) ................................ 2011-048322

(51) Int. Cl.
*G06F 3/038* (2013.01)
*G09G 5/00* (2006.01)
*G09G 3/00* (2006.01)
*G09G 3/32* (2006.01)

(52) U.S. Cl.
CPC .......... *G09G 3/00* (2013.01); *G09G 2310/0267* (2013.01); *G09G 3/3233* (2013.01)
USPC .......................................................... 345/211

(58) Field of Classification Search
None
See application file for complete search history.

(56) References Cited

U.S. PATENT DOCUMENTS

| | | | |
|---|---|---|---|
| 4,549,102 | A | 10/1985 | Segawa et al. |
| 4,902,919 | A | 2/1990 | Spohrer et al. |
| 5,828,262 | A | 10/1998 | Rees |
| 2009/0201071 | A1 | 8/2009 | Jinta |
| 2010/0033476 | A1 | 2/2010 | Yamamoto et al. |
| 2010/0238092 | A1 | 9/2010 | Kobashi |

FOREIGN PATENT DOCUMENTS

| | | | |
|---|---|---|---|
| JP | 59-161921 | | 9/1984 |
| JP | 62-098915 | | 5/1987 |
| JP | 10-064277 | | 3/1998 |
| JP | 2004-222256 | A | 8/2004 |
| JP | 2005-143068 | A | 6/2005 |
| JP | 2008-188749 | | 8/2009 |
| JP | 2009-188749 | A | 8/2009 |
| JP | 2009-188867 | A | 8/2009 |
| JP | 2011-217175 | A | 10/2011 |
| WO | WO-2009/084269 | A1 | 7/2009 |

OTHER PUBLICATIONS

Japanese Office Action issued Apr. 30, 2014 for corresponding Japanese Application No. 2011-048321.
Japanese Office Action issued May 7, 2014 for corresponding Japanese Application No. 2011-048322.

*Primary Examiner* — Nicholas Lee
(74) *Attorney, Agent, or Firm* — Rader, Fishman & Grauer PLLC

(57) ABSTRACT

An inverter circuit includes: a first transistor, a second transistor, a third transistor, a fourth transistor, and a fifth transistor; an input terminal and an output terminal; and a capacitor. The capacitor is inserted between a gate of the second transistor and one of a source and a drain of the second transistor in which the one is located on an output terminal side.

19 Claims, 19 Drawing Sheets

INVERTER CIRCUIT AND DISPLAY UNIT

BACKGROUND

This disclosure relates to an inverter circuit suitable for a display unit, and to a display unit provided with the inverter circuit.

An inverter circuit may be formed by an n-channel MOS transistor and a p-channel MOS transistor that are combined on a single chip, or may be formed only by a single channel MOS transistor. The latter is advantageous over the former in terms of productivity and yield, in that the number of process steps is reduced.

FIG. 32 illustrates an inverter circuit 10 structured only by the n-channel MOS transistor according to a comparative example. For reference, a circuit similar to the inverter circuit illustrated in FIG. 32 is described in Japanese Unexamined Patent Application Publication No. 2009-188749. The inverter circuit 10 illustrated in FIG. 32 has a configuration in which two n-channel MOS transistors T10 and T20 are connected in series. The inverter circuit 10 is inserted between a negative voltage line L10 to which a voltage Vss is applied, and a positive voltage line L20 to which a voltage Vdd is applied. The transistor T10 has a source connected to the negative voltage line L10, a drain connected to a source of the transistor T20, and a gate connected to an input terminal IN. The transistor T20 has a diode connection in which a gate and a drain are connected to each other. More specifically, the transistor T20 has the source connected to the drain of the transistor T10, and the gate and the drain which are connected to the positive voltage line L20. Further, a connection point C between the transistor T10 and the transistor T20 is connected to an output terminal OUT.

SUMMARY

The inventor/the inventors has/have found that, in the inverter circuit 10, a voltage Vout of the output terminal OUT may not have the voltage Vdd but may have a voltage defined by Vdd−Vth when a voltage Vin of the input terminal IN has the voltage Vss, as illustrated in FIG. 33, for example. In other words, the voltage Vout of the output terminal OUT includes a threshold voltage Vth of the transistor T20. Hence, the voltage Vout of the output terminal OUT may be influenced heavily by the variation in the threshold voltage Vth of the transistor T20.

It is desirable to provide an inverter circuit capable of suppressing a power consumption, and a display unit provided with the inverter circuit.

(1) An inverter circuit according to an embodiment of the technology includes: a first transistor, a second transistor, a third transistor, a fourth transistor, and a fifth transistor; an input terminal and an output terminal; and a capacitor. The first transistor makes and breaks electrical connection between the output terminal and a first voltage line, in response to a potential difference between the input terminal and the first voltage line or to an equivalent thereto, the second transistor makes and breaks electrical connection between a second voltage line and the output terminal, in response to a potential difference between a source or a drain of the fourth transistor and the output terminal or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a first control signal inputted to a gate of the fourth transistor, the fifth transistor makes and breaks electrical connection between a fourth voltage line and the first terminal, in response to a second control signal inputted to a gate of the fifth transistor, and the capacitor is inserted between the gate of the second transistor and one of a source and a drain of the second transistor, the one being located on an output terminal side.

(1) A display unit according to an embodiment of the technology includes: a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels. The one or more inverter circuits includes a first transistor, a second transistor, a third transistor, a fourth transistor, and a fifth transistor, a first input terminal and an output terminal, and a capacitor, wherein the first transistor makes and breaks electrical connection between the output terminal and a first voltage line, in response to a potential difference between the first input terminal and the first voltage line or to an equivalent thereto, the second transistor makes and breaks electrical connection between a second voltage line and the output terminal, in response to a potential difference between a source or a drain of the fourth transistor and the output terminal or to an equivalent thereto, the third transistor makes and breaks electrical connection between a gate of the second transistor and a third voltage line, in response to a potential difference between the first input terminal and the third voltage line or to an equivalent thereto, the fourth transistor makes and breaks electrical connection between a first terminal equivalent to a source or a drain of the fifth transistor and the gate of the second transistor, in response to a first control signal inputted to a gate of the fourth transistor, the fifth transistor makes and breaks electrical connection between a fourth voltage line and the first terminal, in response to a second control signal inputted to a gate of the fifth transistor, and the capacitor is inserted between the gate of the second transistor and one of a source and a drain of the second transistor, the one being located on an output terminal side.

(2) An inverter circuit according to an embodiment of the technology includes: a first transistor, a second transistor, a third transistor, a fourth transistor, and a fifth transistor; a first input terminal, a second input terminal, a third input terminal, and an output terminal; and a capacitor. The first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to a source or a drain of the fourth transistor, one of the source and the drain is connected to a second voltage line, and the other of the source and the drain is connected to the output terminal, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, and the capacitor is inserted between the gate of the second transistor and one of the source and the drain of the second transistor, the one being unconnected to the second voltage line.

(2) A display unit according to an embodiment of the technology includes: a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels. The one or more inverter circuits includes a first transistor, a second transistor, a third transistor, a fourth transistor, and a fifth transistor, a first input terminal, a second input terminal, a third input terminal, and an output terminal, and a capacitor, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to a source or a drain of the fourth transistor, one of the source and the drain is connected to a second voltage line, and the other of the source and the drain is connected to the output terminal, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, and the capacitor is inserted between the gate of the second transistor and one of the source and the drain of the second transistor, the one being unconnected to the second voltage line.

(3) An inverter circuit according to an embodiment of the technology includes: a first transistor, a second transistor, a third transistor, a fourth transistor, a fifth transistor, a sixth transistor, and a seventh transistor; an input terminal and an output terminal; and a capacitor. The first transistor makes and breaks electrical connection between a gate of the seventh transistor and a first voltage line, in response to a potential difference between the input terminal and the first voltage line or to an equivalent thereto, the second transistor makes and breaks electrical connection between a second voltage line and the gate of the seventh transistor, in response to a potential difference between a source or a drain of the fourth transistor and the gate of the seventh transistor or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a control signal inputted to a gate of the fourth transistor, the fifth transistor makes and breaks electrical connection between a fourth voltage line and the first terminal, in response to a control signal inputted to a gate of the fifth transistor, the sixth transistor makes and breaks electrical connection between the output terminal and a fifth voltage line, in response to a potential difference between the input terminal and the fifth voltage line or to an equivalent thereto, the seventh transistor makes and breaks electrical connection between a sixth voltage line and the output terminal, in response to a potential difference between the gate of the seventh transistor and the output terminal or to an equivalent thereto, and the capacitor is inserted between the gate of the second transistor and one of a source and a drain of the second transistor, the one being located on an output terminal side.

(3) A display unit according to an embodiment of the technology includes: a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels. The one or more inverter circuits includes a first transistor, a second transistor, a third transistor, a fourth transistor, a fifth transistor, a sixth transistor, and a seventh transistor, a first input terminal and an output terminal, and a capacitor, wherein the first transistor makes and breaks electrical connection between a gate of the seventh transistor and a first voltage line, in response to a potential difference between the first input terminal and the first voltage line or to an equivalent thereto, the second transistor makes and breaks electrical connection between a second voltage line and the gate of the seventh transistor, in response to a potential difference between a source or a drain of the fourth transistor and the gate of the seventh transistor or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a control signal inputted to a gate of the fourth transistor, the fifth transistor makes and breaks electrical connection between a fourth voltage line and the first terminal, in response to a control signal inputted to a gate of the fifth transistor, the sixth transistor makes and breaks electrical connection between the output terminal and a fifth voltage line, in response to a potential difference between the first input terminal and the fifth voltage line or to an equivalent thereto, the seventh transistor makes and breaks electrical connection between a sixth voltage line and the output terminal, in response to a potential difference between the gate of the seventh transistor and the output terminal or to an equivalent thereto, and the capacitor is inserted between the gate of the second transistor and one of a source and a drain of the second transistor, the one being located on an output terminal side.

(4) An inverter circuit according to an embodiment of the technology includes: a first transistor, a second transistor, a third transistor, a fourth transistor, a fifth transistor, a sixth transistor, and a seventh transistor; a first input terminal, a second input terminal, a third input terminal, and an output terminal; and a capacitor. The first transistor has a gate, a source, and a drain in which the gate is connected to the first input terminal, one of the source and the drain is connected to a first voltage line, and the other of the source and the drain is connected to a gate of the seventh transistor, the second transistor has a gate, a source, and a drain in which the gate is connected to a source or a drain of the fourth transistor, one of the source and the drain is connected to a second voltage line, and the other of the source and the drain is connected to the gate of the seventh transistor, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, the sixth transistor has as a gate, a source, and a drain in which the gate is connected to the first input terminal, one of the source and the drain is connected to a fifth voltage line, and the other of the source and the drain is connected to the output terminal, the seventh transistor has the gate, a source, and a drain in which the gate is connected to one of the source and the drain of the second transistor, the one being unconnected to the second voltage line, one of the source and the drain is connected to a sixth voltage line, and the other of the source and the drain is connected to the output terminal, and the capacitor is inserted between the gate of the second transistor and one of the source and the drain of the second transistor, the one being unconnected to the second voltage line.

(4) A display unit according to an embodiment of the technology includes: a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels. The one or more inverter circuits includes a first transistor, a second transistor, a third transistor, a fourth transistor, a fifth transistor, a sixth transistor, and a seventh transistor, a first input terminal, a second input terminal, a third input terminal, and an output terminal, and a capacitor, wherein the first transistor has a gate, a source, and a drain in which the gate is connected to the first input terminal, one of the source and the drain is connected to a first voltage line, and the other of the source and the drain is connected to a gate of the seventh transistor, the second transistor has a gate, a source, and a drain in which the gate is connected to a source or a drain of the fourth transistor, one of the source and the drain is connected to a second voltage line, and the other of the source and the drain is connected to the gate of the seventh transistor, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, the sixth transistor has as a gate, a source, and a drain in which the gate is connected to the first input terminal, one of the source and the drain is connected to a fifth voltage line, and the other of the source and the drain is connected to the output terminal, the seventh transistor has the gate, a source, and a drain in which the gate is connected to one of the source and the drain of the second transistor, the one being unconnected to the second voltage line, one of the source and the drain is connected to a sixth voltage line, and the other of the source and the drain is connected to the output terminal, and the capacitor is inserted between the gate of the second transistor and one of the source and the drain of the second transistor, the one being unconnected to the second voltage line.

In the inverter circuits (1) to (4) and the display units (1) to (4) according to the embodiments of the technology, an on and off operation of the fourth and the fifth transistors which are connected between the gate of the second transistor and the fourth voltage line and of the third transistor connected between the gate of the second transistor and the third voltage line allows, in one embodiment, the first and the second transistors not to be turned on together throughout the time period and to allow the first and the second transistors to be turned on together only when the voltage of the input terminal falls. Hence, the embodiments of the technology make it possible to control a through current by the on and off operation of the third transistor, the fourth transistor, and the fifth transistor.

(5) An inverter circuit according to an embodiment of the technology includes: a first transistor, a second transistor, and a third transistor; a first input terminal, a second input terminal, and a first output terminal; a first capacitor; and a control device including a third input terminal, a fourth input terminal, and a second output terminal. The first transistor makes and breaks electrical connection between the first output terminal and a first voltage line, in response to a potential difference between the first input terminal and the first voltage line or to an equivalent thereto, the second transistor makes and breaks electrical connection between a second voltage line and the output terminal, in response to a potential difference between the second output terminal and the first output terminal or to an equivalent thereto, the third transistor makes and breaks electrical connection between the second input terminal and the fourth input terminal, in response to a potential difference between the first input terminal and the second input terminal or to an equivalent thereto, the first capacitor is inserted between a gate of the second transistor and one of a source and a drain of the second transistor, the one being located on a first output terminal side, and the control device outputs, from the second output terminal, a voltage which allows the second transistor to turn on, only when the third input terminal stays at a high level during a time period in which both the first input terminal and the second input terminal stay at a high level.

(5) A display unit according to an embodiment of the technology includes: a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels. The one or more inverter circuits includes a first transistor, a second transistor, and a third transistor, a first input terminal, a second input terminal, and a first output terminal, a first capacitor, and a control device including a third input terminal, a fourth input terminal, and a second output terminal, wherein the first transistor makes and breaks electrical connection between the first output terminal and a first voltage line, in response to a potential difference between the first input terminal and the first voltage line or to an equivalent thereto, the second transistor makes and breaks electrical connection between a second voltage line and the output terminal, in response to a potential difference between the second output terminal and the first output terminal or to an equivalent thereto, the third transistor makes and breaks electrical connection between the second input terminal and the fourth input terminal, in response to a potential difference between the first input terminal and the second input terminal or to an equivalent thereto, the first capacitor is inserted between a gate of the second transistor and one of a source and a drain of the second transistor, the one being located on a first output terminal side, and the control device outputs, from the second output terminal, a voltage which allows the second transistor to turn on, only when the third input terminal stays at a high level during a time period in which both the first input terminal and the second input terminal stay at a high level.

(6) An inverter circuit according to an embodiment of the technology includes: a first transistor, a second transistor, and a third transistor; a first input terminal, a second input terminal, and a first output terminal; a first capacitor; and a control device including a third input terminal, a fourth input terminal, and a second output terminal. The first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to the second output terminal, one of the source and the drain is connected to a second voltage line, and the other of the source and the drain is connected to the output terminal, the third transistor has a gate, a source, and a drain in which the gate is connected to the first input terminal, one of the source and the drain is connected to the second input terminal, and the other of the source and the drain is connected to the third input terminal, the first capacitor is inserted between a gate of a fifth transistor and one of a source and a drain of the fifth transistor, the one being unconnected to a third voltage line, the fourth input terminal in the control device is connected to one of the source and the drain of the third transistor, the one being unconnected to the second input terminal, and the second output terminal in the control device is connected to the gate of the second transistor, and the control device outputs, from the second output terminal, a voltage which allows the second transistor to turn on, only when the third input terminal stays at a high level during a time period in which both the first input terminal and the second input terminal stay at a high level.

(6) A display unit according to an embodiment of the technology includes: a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels. The one or more inverter circuits including a first transistor, a second transistor, and a third transistor, a first input terminal, a second input terminal, and a first output terminal, a first capacitor, and a control device including a third input terminal, a fourth input terminal, and a second output terminal, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to the second output terminal, one of the source and the drain is connected to a second voltage line, and the other of the source and the drain is connected to the output terminal, the third transistor has a gate, a source, and a drain in which the gate is connected to the first input terminal, one of the source and the drain is connected to the second input terminal, and the other of the source and the drain is connected to the third input terminal, the first capacitor is inserted between a gate of a fifth transistor and one of a source and a drain of the fifth transistor, the one being unconnected to a third voltage line, the fourth input terminal in the control device is connected to one of the source and the drain of the third transistor, the one being unconnected to the second input terminal, and the second output terminal in the control device is connected to the gate of the second transistor, and the control device outputs, from the second output terminal, a voltage which allows the second transistor to turn on, only when the third input terminal stays at a high level during a time period in which both the first input terminal and the second input terminal stay at a high level.

In the inverter circuits (5) and (6) and the display units (5) and (6) according to the embodiments of the technology, the voltage of the second input terminal is supplied to the gate of the second transistor through the third transistor and the control device which are turned on and off in response to the voltage applied from the first input terminal. Hence, the voltage which allows the second transistor to turn on is outputted from the second output terminal, only when the third input terminal stays at the high level during the time period in which both the first input terminal and the second input terminal stay at the high level. In other words, the time period during which the first transistor and the second transistor are turned on together is controllable by the voltage inputted to the third input terminal.

Advantageously, the transistors in each of the inverter circuits (1) to (6) and the display units (1) to (6) may be of a same channel type.

According to the inverter circuits (1) to (4) and the display units (1) to (4) of the embodiments of the technology, the on and off operation of the third transistor, the fourth transistor, and the fifth transistor controls the through current, making it possible to suppress a power consumption.

According to the inverter circuits (5) and (6) and the display units (5) and (6) of the embodiments of the technology, the time period during which the first transistor and the second transistor are turned on together is made controllable by the voltage inputted to the third input terminal in the control device, making it possible to reduce a through current, and thereby to suppress a power consumption.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some embodiments of the technology will be described in detail with reference to the accompanying drawings. The description is given in the following order.

1. First Embodiment (an inverter circuit having a "5Tr1C" configuration)
2. Modifications (an inverter circuit having a "7Tr1C" configuration)
3. Second Embodiment (FIGS. 17 to 24)
4. Modifications (FIG. 25)
5. Application Example (a display unit)

1. First Embodiment

[Configuration]

Figure 1:
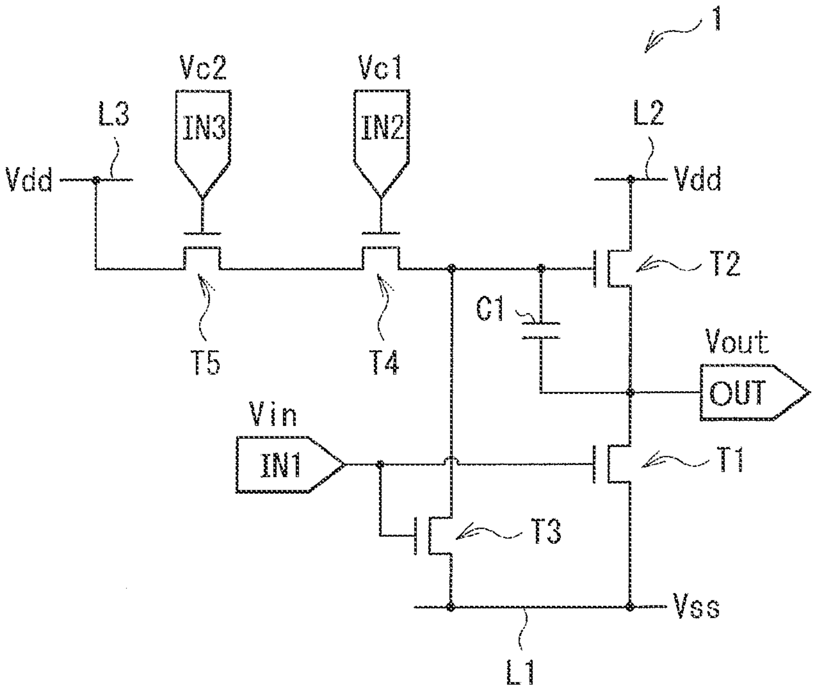
FIG. 1 is a circuit diagram illustrating an example of an inverter circuit according to a first embodiment of the technology.

FIG. 1 illustrates an example of an overall configuration of an inverter circuit 1 according to a first embodiment of the technology. The inverter circuit 1 substantially inverts a signal waveform of a pulse signal inputted to an input terminal IN (for example, (A) of FIG. 2), and outputs a pulse signal, whose waveform is the substantial inversion of the signal waveform inputted to the input terminal IN, from an output terminal OUT (for example, (D) of FIG. 2). The inverter circuit 1 may be preferably formed on such as amorphous silicon and an amorphous oxide semiconductor, and may have five transistors T1 to T5 which are of the same channel type with respect to one another, for example. The inverter circuit 1, in addition to the five transistors T1 to T5 mentioned previously, is provided with one capacitor C1, three input terminals IN1, IN2, and IN3, and one output terminal OUT, and thus has a "5Tr1C" circuit configuration.

In one embodiment, the transistor T1 corresponds to a concrete (but not limitative) example of a "first transistor". The transistor T2 corresponds to a concrete (but not limitative) example of a "second transistor". The transistor T3 corresponds to a concrete (but not limitative) example of a "third transistor". The transistor T4 corresponds to a concrete (but not limitative) example of a "fourth transistor". The transistor T5 corresponds to a concrete (but not limitative) example of a "fifth transistor". The capacitor C1 corresponds to a concrete (but not limitative) example of a "capacitor". The input terminal IN1 corresponds to a concrete (but not limitative) example of a "first input terminal". The input terminal IN2 corresponds to a concrete (but not limitative) example of a "second input terminal". The input terminal IN3 corresponds to a concrete (but not limitative) example of a "third input terminal".

The transistors T1 to T5 are thin-film transistors (TFT) which are of the same channel type with respect to one another. Each of the transistors T1 to T5 may be a thin-film transistor of an n-channel MOS (Metal Oxide Semiconductor) type, for example. An on-resistance of the transistor T1 may be smaller than an on-resistance of the transistor T2. More preferably, the on-resistance of the transistor T1 may be sufficiently smaller than the on-resistance of the transistor T2.

The transistor T1 may make and break electrical connection between the output terminal OUT and a low voltage line L1, in response to a potential difference between a voltage of the input terminal IN1 (hereinafter referred to as an "input voltage Vin") and a voltage Vss of the low voltage line L1 (or to an equivalent thereto), for example. A gate of the transistor T1 is electrically connected to the input terminal IN1. A source or a drain of the transistor T1 is electrically connected to the low voltage line L1, and a terminal of one of the source and the drain of the transistor T1 unconnected to the low voltage line L1 is electrically connected to the output terminal OUT.

The transistor T2 may make and break electrical connection between a high voltage line L2 and the output terminal OUT, in response to a potential difference between a voltage of a terminal of one of a source and a drain of the transistor T4 unconnected to the transistor T5 (hereinafter referred to as a "terminal A") and a voltage of the output terminal OUT (hereinafter referred to as an "output voltage Vout") (or to an equivalent thereto), for example. A gate of the transistor T2 is electrically connected to the terminal A of the transistor T4. A source or a drain of the transistor T2 is electrically connected to the output terminal OUT, and a terminal of one of the source and the drain of the transistor T2 unconnected to the output terminal OUT is electrically connected to the high voltage line L2.

The transistor T3 may make and break electrical connection between the gate of the transistor T2 and the low voltage line L1, in response to a potential difference between the input voltage Vin and a voltage of the low voltage line L1 (or to an equivalent thereto), for example. A gate of the transistor T3 is electrically connected to the input terminal IN1. A source or a drain of the transistor T3 is electrically connected to the low voltage line L1, and a terminal of one of the source and the drain of the transistor T3 unconnected to the low voltage line L1 is electrically connected to the gate of the transistor T2. In other words, the transistors T1 and T3 are connected to the same voltage line with respect to each other (more specifically, the low voltage line L1, for example). Hence, a terminal of the transistor T1 connected to the low voltage line L1 and a terminal of the transistor T3 connected to the low voltage line L1 have the same potential with respect to each other.

The transistor T4 may make and break electrical connection between a source or a drain of the transistor T5 (hereinafter referred to as a "terminal B") and the gate of the transistor T2, in response to a control signal Vc1 inputted to a gate of the transistor T4 through the input terminal IN2, for example. The gate of the transistor T4 is electrically connected to the input terminal IN2. The terminal A of the transistor T4 is electrically connected to the gate of the transistor T2, and a terminal of one of the source and the drain of the transistor T4 different from the terminal A is electrically connected to a source or a drain of the transistor T5.

The transistor T5 may make and break electrical connection between a high voltage line L3 and a terminal of one of the source and the drain of the transistor T4 different from the terminal A, in response to a control signal Vc2 inputted to a gate of the transistor T5 through the input terminal IN3, for example. The gate of the transistor T5 is electrically connected to the input terminal IN3. The source or the drain of the transistor T5 is connected to the high voltage line L3. The terminal B of the transistor T5 is electrically connected to a terminal of one of the source and the drain of the transistor T4 different from the terminal A.

In one embodiment, the low voltage line L1 corresponds to a concrete (but not limitative) example of a "first voltage line" and a "third voltage line". The high voltage line L2 corresponds to a concrete (but not limitative) example of a "second voltage line". The high voltage line L3 corresponds to a concrete (but not limitative) example of a "fourth voltage line". The terminal B of the transistor T5 corresponds to a concrete (but not limitative) example of a "first terminal".

Each of the high voltage lines L2 and L3 is connected to an unillustrated power source that outputs a voltage (for example, a constant voltage) higher than the voltage of the low voltage line L1. The high voltage line L2 has, when the inverter circuit 1 is driven, the voltage Vdd at a high level. The high voltage line L3 may have, when the inverter circuit 1 is driven, the high level voltage Vdd, for example. The voltage of the high voltage line L3 may be the same as the voltage of the high voltage line L2, or may be higher than the voltage of the high voltage line L2 (for example, may be higher than the high level voltage Vdd). In one embodiment where the voltages of the high voltage lines L2 and L3 are equal to each other, the high voltage lines L2 and L3 may be configured by a common voltage line. On the other hand, the low voltage line L1 is connected to an unillustrated power source that outputs a voltage (for example, a constant voltage) lower than the voltages of the high voltage lines L2 and L3. The low voltage line L1 has, when the inverter circuit 1 is driven, the voltage Vss at a low level (<Vdd).

Figure 2:
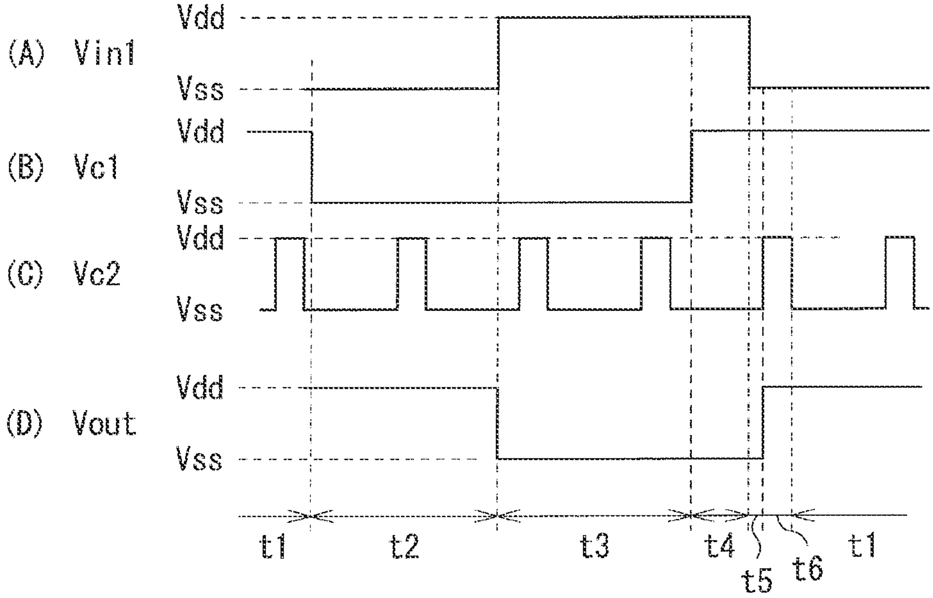
FIG. 2 is a waveform chart illustrating examples of waveforms of input and output signals in the inverter circuit in FIG. 1.

The input terminal IN2 is connected to an unillustrated power source S1 that outputs a predetermined pulse signal. The input terminal IN3 is connected to an unillustrated power source S2 that outputs a predetermined pulse signal. As illustrated in Part (B) of FIG. 2, the power source S1 may output the low level voltage Vss as a control signal Vc1, during a predetermined time period from rising of the input voltage Vin up to falling of the input voltage Vin, for example. Part (B) of FIG. 2 illustrates an example where the power source S1 outputs the low level voltage Vss as the control signal Vc1, for a time period longer than a time period during which the input voltage Vin continuously has the high level voltage Vdd. Also, as illustrated in Part (B) of FIG. 2, the power source S1 may output the high level voltage Vdd as the control signal Vc1, during a time period other than the time period described above, for example.

On the other hand, as illustrated in Part (C) of FIG. 2, the power source S2 may output, as a control signal Vc2, the pulse signal in which the high level voltage Vdd and the low level voltage Vss are repeated alternately, with a period shorter than the time period during which the input voltage Vin continuously has the high level voltage Vdd.

Also, the power source S2 may so output the control signal Vc2 that the transistors T4 and T5 do not turn on together (fail to stay turned-on together) during the time period in which the input voltage Vin has the high level voltage Vdd, as illustrated in Part (C) of FIG. 2, for example. More specifically, the power source S2 may output the low level voltage Vss as the control signal Vc2, during a time period in which the input voltage Vin has the high level voltage Vdd and in which the control signal Vc1 applied to the input terminal IN2 is the high level voltage Vdd, as illustrated in Part (C) of FIG. 2, for example. As used herein, the wording "during a time period in which the input voltage Vin has the high level voltage Vdd" refers to a time period from rising of the input voltage Vin up to falling of the input voltage Vin.

Further, the power source S2 may so output the control signal Vc2 as to allow the time period during which the high level voltage Vdd is outputted to be out of a time point at which the input voltage Vin falls, as illustrated in Part (C) of FIG. 2, for example. More specifically, the power source may output the high level voltage Vdd as the control signal Vc2, immediately after a time point at which the input voltage Vin has fallen, as illustrated in Part (C) of FIG. 2, for example.

The capacitor C1 is inserted between the gate of the transistor T2 and a terminal of one of the source and the drain of the transistor T2 unconnected to the high voltage line L2 (for example, a terminal of the transistor T2 connected to the output terminal OUT). A capacity of the capacitor C1 has a value by which the gate of the transistor T2 is charged at a voltage higher than that defined by Vss+Vth2 and higher than that defined by Vdd−Vth4, when the falling voltage is supplied to the input terminal IN1 and the transistors T1 and T3 are turned off. The Vth2 is a threshold voltage of the transistor T2, and Vth4 is a threshold voltage of the transistor T4.

Figure 34:
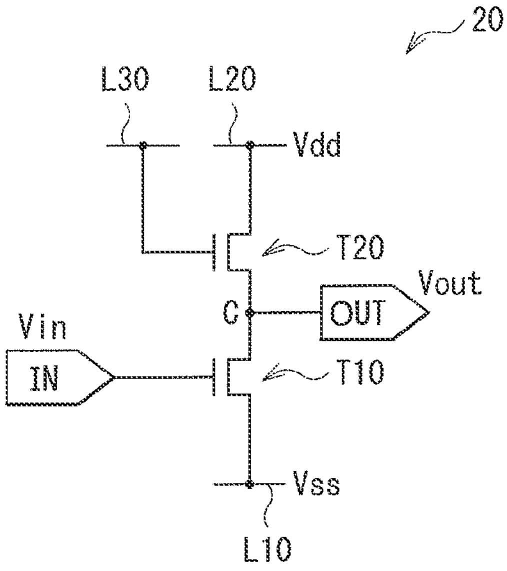
FIG. 34 is a circuit diagram illustrating another example of an inverter circuit according to a comparative example.

It is to be noted that the inverter circuit 1 may be equivalent to that in which a control device and the capacitor C1 are inserted between the transistors T1 and T2 in an output stage and the input terminal IN1, in connection with such as the inverter circuit 20 according to a comparative example illustrated in FIG. 34. The control device includes the transistors T3, T4, and T5. The control device, by an on and off operation of the transistors T3, T4, and T5 which is based on the input voltage Vin and the control signals Vc1 and Vc2, controls turning on and off of the transistors T1 and T2 in the output stage. More specifically, the control device so turns on the transistors T1 and the T2 alternately that the transistors T1 and T2 in the output stage do not turn on together for all the time periods. Also, the control device turns off the transistor T2 at the same time or substantially the same time as the rising of the input voltage Vin, and turns on the transistor T2 immediately after the falling of the input voltage Vin.

[Operation]

An example of an operation of the inverter circuit 1 will now be described with reference to FIGS. 3 to 8. FIGS. 3 to 8 are circuit diagrams illustrating an example of a series of operations of the inverter circuit 1.

Figure 3:
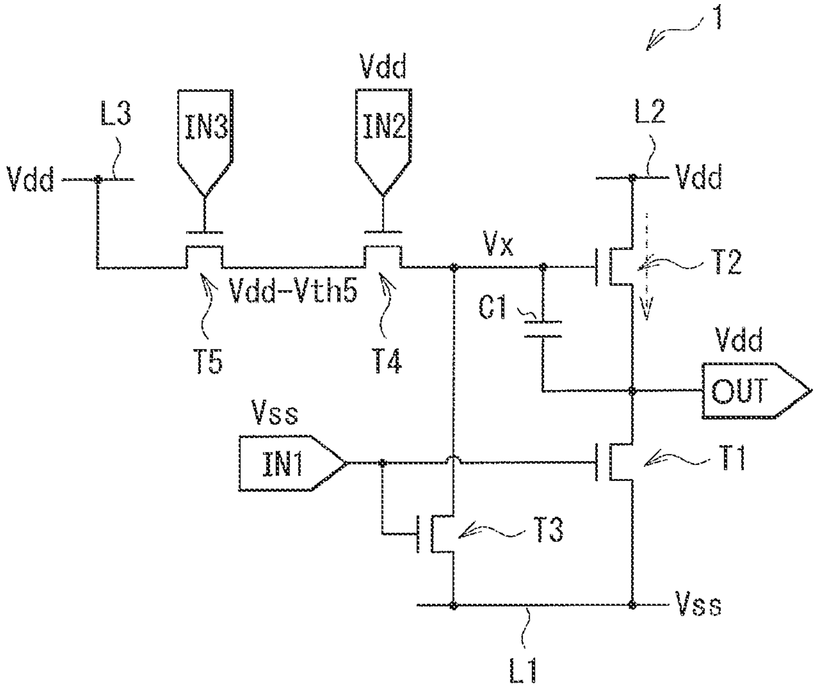
FIG. 3 is a circuit diagram for describing an example of an operation of the inverter circuit in FIG. 1.

First, referring to FIG. 3, the input voltage Vin has the low level voltage Vss and the transistors T1 and T3 are turned off in a time period t1. Also, in the time period t1, the high level voltage Vdd is applied as the control signal Vc1 to the input terminal IN2. Further, in the time period t1, the pulse signal in which the high level voltage Vdd and the low level voltage Vss are repeated alternately with a short period is applied as the control signal Vc2 to the input terminal IN3.

At this time, as illustrated in FIG. 3, a gate potential of the transistor T2 is at Vx which is higher than the voltage defined by Vdd+Vth2, thereby allowing the transistor T2 to be turned on and allowing the voltage Vdd to be outputted as the output voltage Vout (to be described later in detail). Further, the Vx is higher than the voltage defined by Vdd−Vth4 and a current hardly flows from the gate of the transistor T2 to the transistor T4, by which a potential of each node hardly changes.

Figure 4:
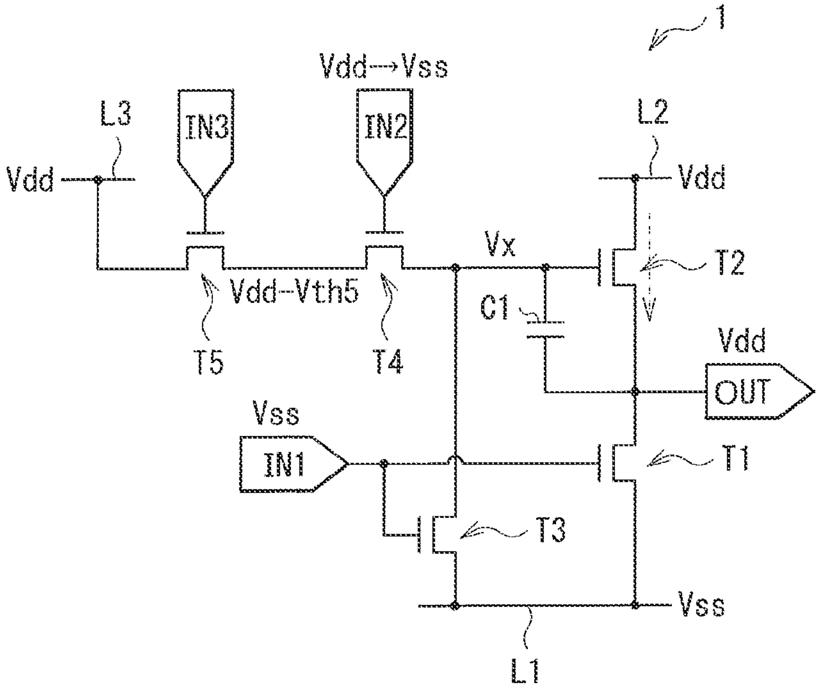
FIG. 4 is a circuit diagram for describing an example of an operation subsequent to that of FIG. 3.

Then, as illustrated in FIG. 4, the voltage of the input terminal IN2 changes (i.e., falls) from the high level voltage Vdd to the low level voltage Vss, and the time periods transit from the time period t1 to a time period t2. Thereby, the transistor T4 is turned off, by which the potential of each of the nodes is unchanged and the output voltage Vout remains the same as the voltage Vdd, even when the voltage of the input terminal IN3 changes to the high level voltage Vdd or changes to the low level voltage Vss.

Figure 5:
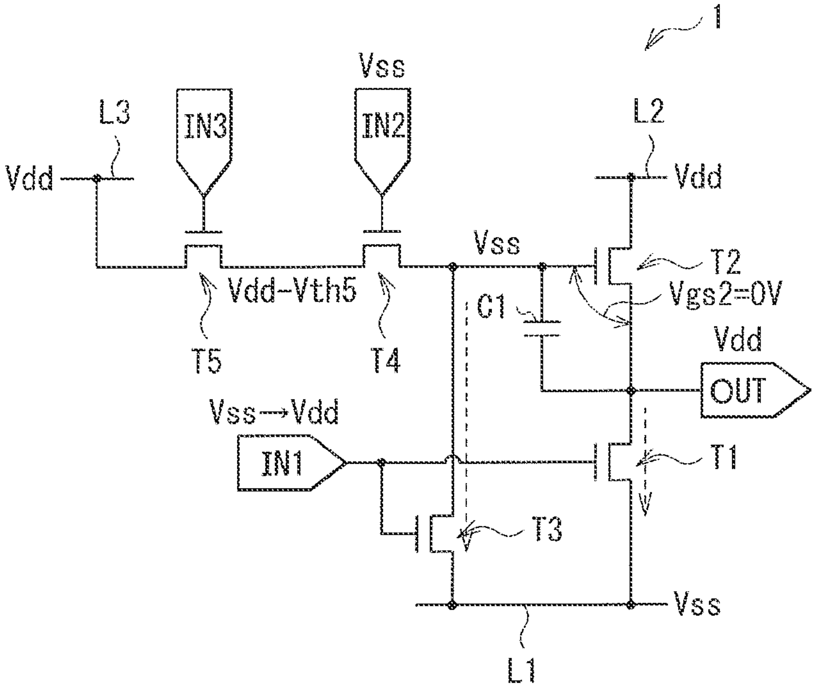
FIG. 5 is a circuit diagram for describing an example of an operation subsequent to that of FIG. 4.

Then, as illustrated in FIG. 5, the input voltage Vin changes (i.e., rises) from the low level voltage Vss to the high level voltage Vdd, and the time periods transit from the time period t2 to a time period t3. Thereby, the transistors T1 and T3 are turned on, and the gate of the transistor T2 and the output terminal OUT are charged at the voltage Vss. As a result, a voltage Vgs2 between the gate and the source of the transistor T2 is at 0V, allowing the transistor T2 to be turned off (where the threshold voltage Vth2 is higher than 0V), for example. Further, even though the voltage of the input terminal IN3 changes to the high level voltage Vdd or to the low level voltage Vss in the time period t3 as well, the gate potential of the transistor T2 remains unchanged since the transistor T4 is off. In other words, a through current does not flow from the high voltage line L2 to the low voltage line L1 in the time period t3.

Figure 6:
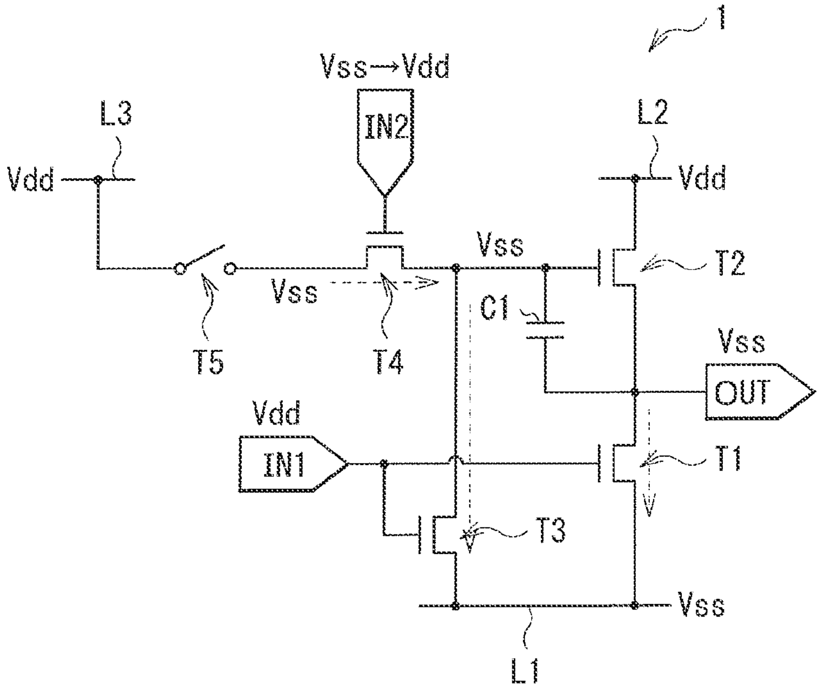
FIG. 6 is a circuit diagram for describing an example of an operation subsequent to that of FIG. 5.

Following an elapse of a predetermined time period, as illustrated in FIG. 6, the voltage of the input terminal IN2 changes (i.e., rises) from the low level voltage Vss to the high level Vdd when the input voltage Vin and the voltage of the input terminal IN3 have the high level voltage Vdd and the low level voltage Vss, respectively, and the time periods transit from the time period t3 to a time period t4. Thereby, the transistor T4 is turned on, allowing a potential at a connection point of the transistor T4 and the transistor T5 to be charged at the voltage Vss. It is to be noted that the through current does not flow at this time as well, since the voltage of the input terminal IN3 has the low level voltage Vss.

Figure 7:
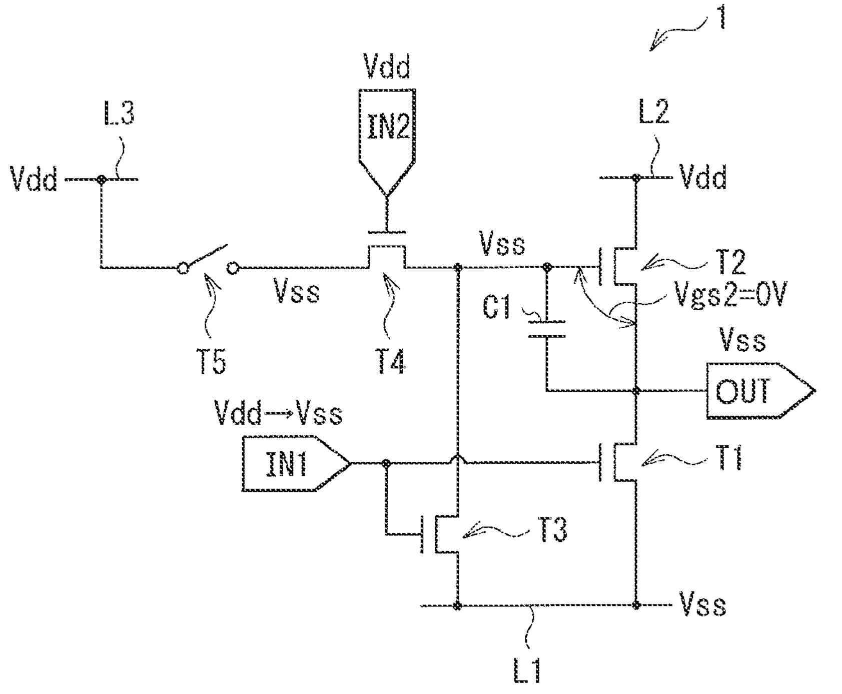
FIG. 7 is a circuit diagram for describing an example of an operation subsequent to that of FIG. 6.

Then, as illustrated in FIG. 7, the input voltage Vin changes (i.e., falls) from the high level voltage Vdd to the low level voltage Vss, and the time periods transit from the time period t4 to a time period t5. Thereby, each of the transistors T1 and T3 is turned off, but here the potential of each of the nodes does not change.

Figure 8:
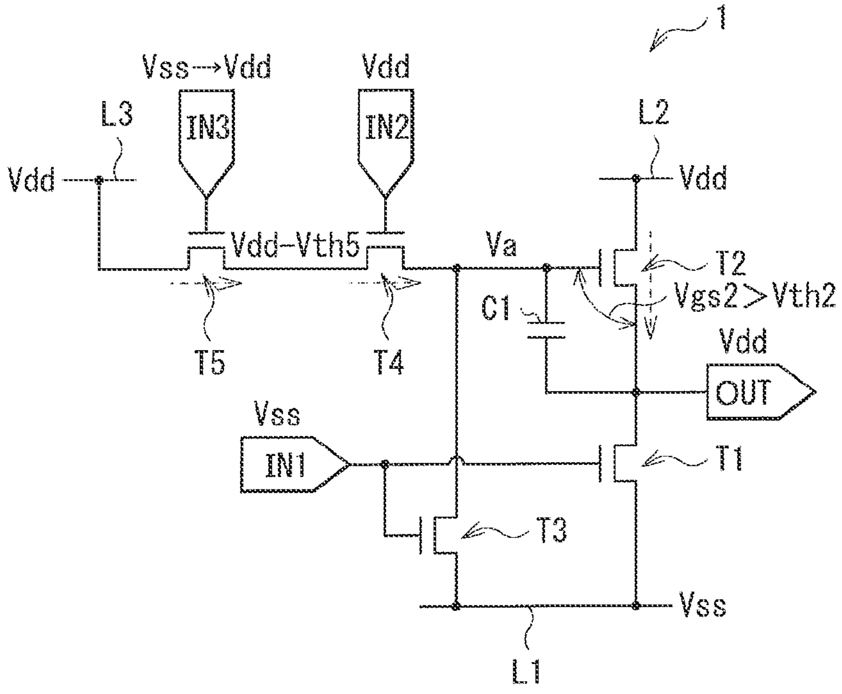
FIG. 8 is a circuit diagram for describing an example of an operation subsequent to that of FIG. 7.

Then, as illustrated in FIG. 8, the voltage of the input terminal IN3 changes (i.e., rises) from the low level voltage Vss to the high level voltage Vdd, and the time periods transit from the time period t5 to a time period t6. Thereby, through the transistors T4 and T5, the gate potential of the transistor T2 starts to rise gradually from the low level voltage Vss. When the gate potential of the transistor T2 exceeds the voltage defined by Vss+Vth2, the voltage Vgs2 becomes higher than the threshold voltage Vth2. As a result, the transistor T2 is turned on, by which a current flows from the high voltage line L2 and a source voltage of the transistor T2 (i.e., the output voltage Vout) starts to rise.

At this time, the capacitor C1 is connected between the gate and the source of the transistor T2. Hence, a gate voltage of the transistor T2 also rises by virtue of the rising of the source voltage. When the gate voltage of the transistor T2 becomes higher than the voltage defined by Vdd−Vth4, the transistor T4 is turned off, by which the gate voltage of the transistor T2 continues to rise only by virtue of the increase in the source voltage through the capacitor C1. The gate voltage of the transistor T2 eventually reach a voltage Va, and the high level voltage Vdd is outputted as the output voltage Vout.

Thus, in the inverter circuit 1 according to the present embodiment, the pulse signal (for example, (D) of FIG. 2), whose waveform is the substantial inversion of the signal waveform inputted to the input terminal IN (for example, (A) of FIG. 2), is outputted from the output terminal OUT in the manner described above.

[Effect]

Figure 32:
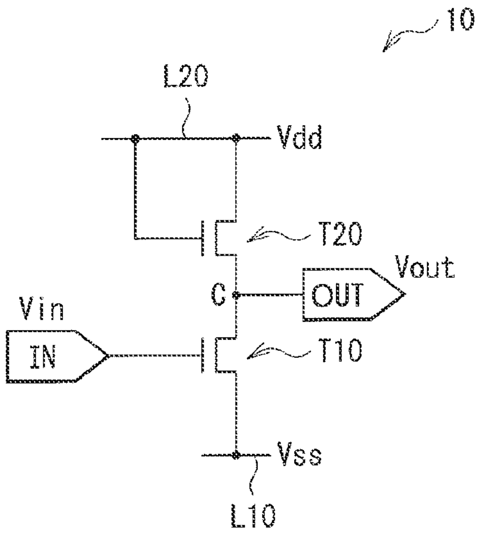
FIG. 32 is a circuit diagram illustrating an example of an inverter circuit according to a comparative example.
Figure 33:
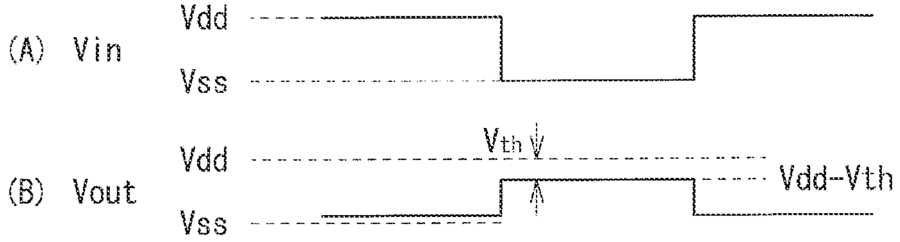
FIG. 33 is a waveform chart illustrating examples of waveforms of input and output signals in the inverter circuit in FIG. 32.

Referring to FIG. 32, an inverter circuit 10 according to a comparative example has a circuit configuration of a single channel type, in which two n-channel MOS transistors T10 and T20 are connected in series, for example. In this inverter circuit 10, an output voltage Vout may not have a voltage Vdd but may have a voltage defined by Vdd−Vth when an input voltage Vin has a voltage Vss, as illustrated in FIG. 33, for example. In other words, the output voltage Vout includes a threshold voltage Vth of the transistor T20. Hence, the output voltage Vout may be influenced heavily by the variation in the threshold voltage Vth of the transistor T20.

To address this, a measure may be contemplated in which a gate and a drain of the transistor T20 may be electrically isolated, and the gate may be connected to a positive voltage line L30 to which a voltage Vss2 higher than the voltage Vdd of the drain (=Vdd+Vth) is applied, as illustrated in FIG. 34 which illustrates an inverter circuit 20 according to a comparative example, for example. Also, a measure may be contemplated in which a bootstrap circuit configuration is employed, as illustrated in FIG. 35 which illustrates an inverter circuit 30 according to a comparative example, for example.

Figure 35:
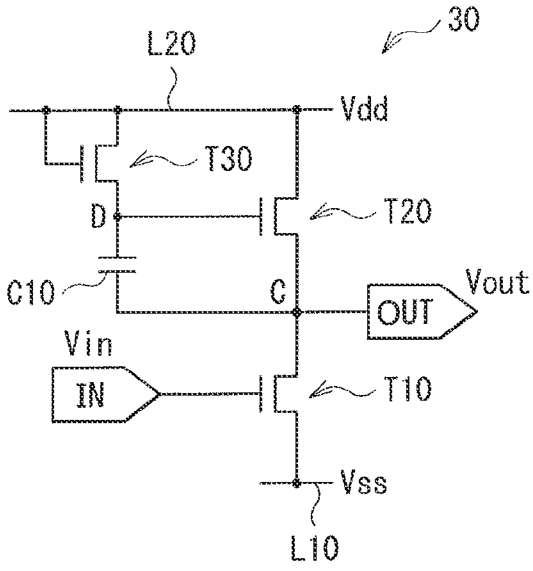
FIG. 35 is a circuit diagram illustrating yet another example of an inverter circuit according to a comparative example.

In each of the circuits illustrated in FIGS. 32, 34, and 35, however, a current (for example, a through current) may flow from the positive voltage line L20 to the negative voltage line L10 through the transistors T10 and T20, during when the input voltage Vin is at a high level, i.e., until when the output voltage Vout is at a low level. As a result, a power consumption in the inverter circuit may become large.

In contrast, in the inverter circuit 1 according to the present embodiment, the on and off operation of the transistors T4 and T5 connected between the gate of the transistor T2 and the high voltage line L3 and of the transistor T3 connected between the gate of the transistor T2 and the low voltage line L1 allows the transistors T1 and T2 not to be turned on together for all the time periods. Thus, in the present embodiment, the through current is not generated throughout the entire time periods. Hence, it is possible to keep the power consumption low as compared with such as the inverter circuits described in FIGS. 32, 34, and 35.

2. Modifications

[First Modification]

Figure 9:
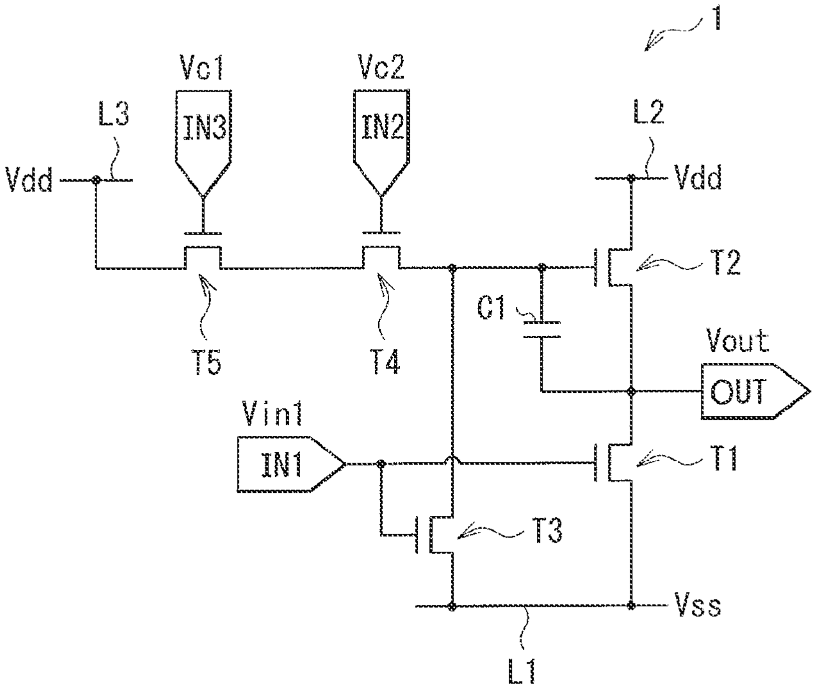
FIG. 9 is a circuit diagram illustrating another example of the input signal in the inverter circuit in FIG. 1.

In the embodiment described above, the control signal Vc1 is applied to the input terminal IN2, and the control signal Vc2 is applied to the input terminal IN3. Alternatively, the control signal Vc2 may be applied to the input terminal IN2, and the control signal Vc1 may be applied to the input terminal IN3, as illustrated in FIG. 9, for example. The through current is not generated throughout the entire time periods in the first modification as well, making it possible to keep the power consumption low as in the embodiment described above.

[Second Modification]

Figure 10:
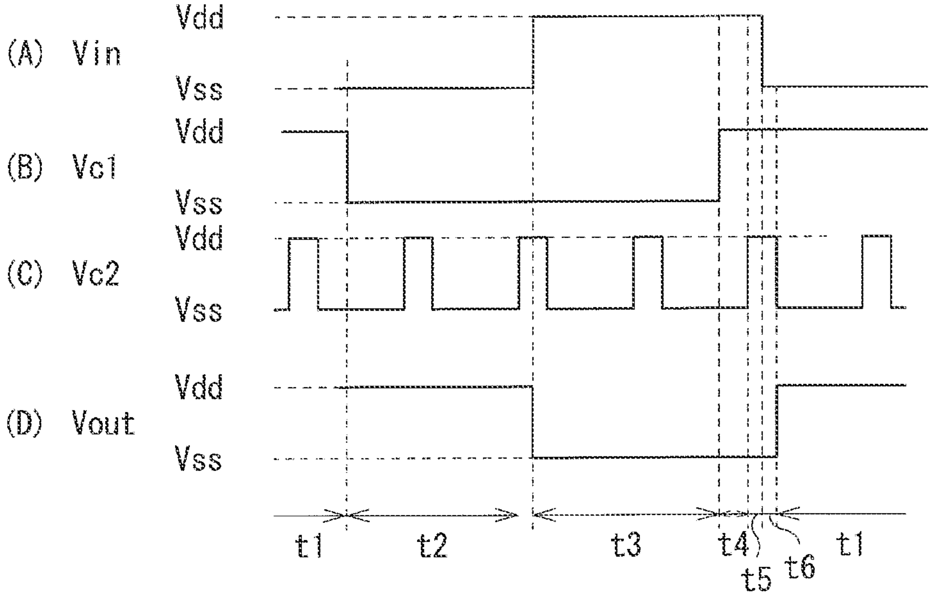
FIG. 10 is a waveform chart illustrating other examples of the waveforms of the input and output signals in the inverter circuit in FIGS. 1 and 9.

In the embodiment described above, the control signal Vc2 is so inputted to the input terminal IN3 as to allow the time period during which the high level voltage Vdd is outputted to be out of the time point at which the input voltage Vin falls. Alternatively, the control signal Vc2 may be so inputted to the input terminal IN3 as to allow the time period during which the high level voltage Vdd is outputted to include the time point at which the input voltage Vin falls. For example, the high level voltage Vdd may be inputted as the control signal Vc2 to the input terminal IN3 immediately before the falling of the input voltage Vin as illustrated in FIG. 10, for example. Also, although unillustrated, the high level voltage Vdd may be inputted as the control signal Vc2 to the input terminal IN3 at the same time or substantially the same time as the falling of the input voltage Vin, for example. In other words, a time period may be present slightly in which the voltages of the input terminals IN1, IN2, and IN3 have the high level voltage Vdd among one another (hereinafter referred to as an overlap time period). In the following, an operation in the overlap time period will be described.

Figure 11:
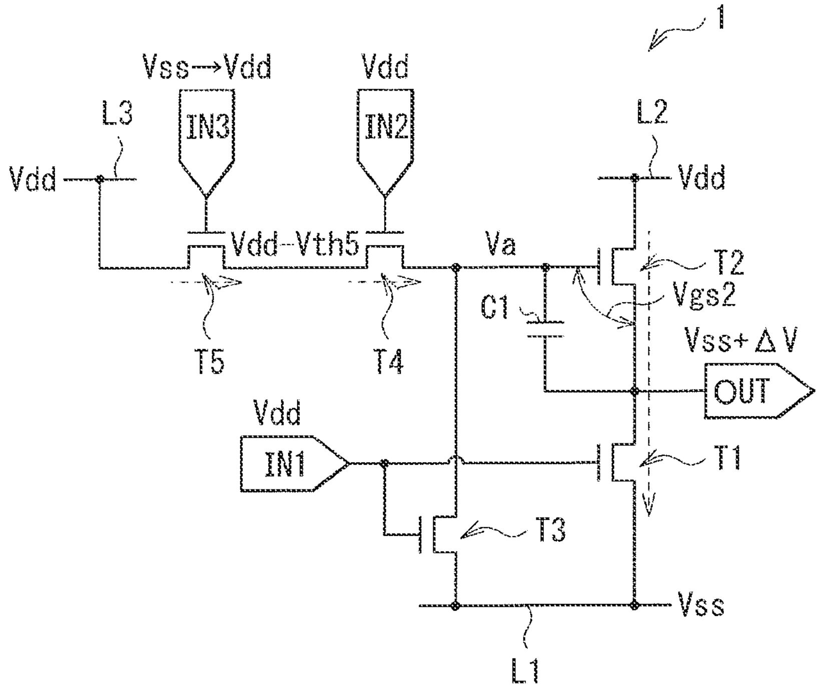
FIG. 11 is a circuit diagram for describing an example of an operation of the inverter circuit in FIG. 10.

As illustrated in FIG. 11, the voltage of the input terminal IN3 changes (i.e., rises) from the low level voltage Vss to the high level Vdd in the time period t4 during which the voltages of both the input terminals IN1 and IN2 have the high level voltage Vdd, and the time periods transit from the time period t4 to a time period t7. At this time, the voltages of both the input terminals IN2 and IN3 have the high level voltage Vdd, by which each of the transistors T4 and T5 is turned on. Thereby, a current flows from the high voltage line L3 to the low voltage line L1 through the transistors T3, T4, and T5, allowing the gate potential of the transistor T2 to be at a voltage Vb. Here, the voltage Vb is higher than the voltage defined by Vss+Vth2, allowing the transistor T2 to be turned on as well, and allowing a current to flow from the high voltage line L2 to the low voltage line L1 through the transistors T1 and T2. As a result, the output voltage Vout changes from the low level voltage Vss to a voltage defined by Vss+ΔV, where ΔV nearly equals to zero when the on-resistance of the transistor T1 is sufficiently smaller than the on-resistance of the transistor T2.

Figure 12:
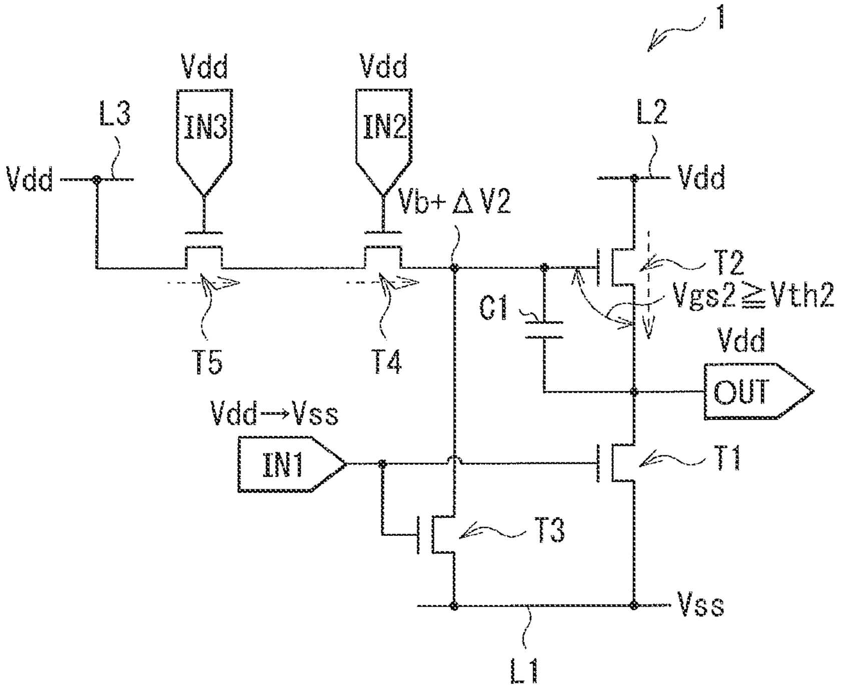
FIG. 12 is a circuit diagram for describing an example of an operation subsequent to that of FIG. 11.

Immediately thereafter, the input voltage Vin changes (i.e., falls) from the high level voltage Vdd to the low level voltage Vss, and the time periods transit from the time period t7 to a time period t8. Thereby, the transistors T1 and T3 are turned off. Here, the voltage Vgs2 between the gate and the source of the transistor T2 is equal to or higher than the threshold voltage Vth2, by which a current flows from the high voltage line L2 as illustrated in FIG. 12. As a result, the gate voltage of the transistor T2 rises not only by virtue of the writing involving the transistors T4 and T5 but also by virtue of the rising of the source voltage through the capacitor C1 (for example, rises by an amount corresponding to ΔV2 in the drawing), and the high level voltage Vdd is outputted eventually as the output voltage Vout. Thus, the gate voltage of the transistor T2 may be set to be high in advance in changing of the output voltage Vout from the low level voltage Vss to the high level voltage Vdd, to allow a transient property of the output voltage Vout to be fast. As a result, this makes it possible to operate the inverter circuit 1 at high speed.

[Third Modification]

In the second modification described above, the through current may flow through the transistors T1 and T2 during a slight time period from a time point immediately before the falling of the input voltage Vin up to a time point immediately after the falling of the input voltage Vin, as illustrated in FIG. 11. In general, an inverter circuit is often used as a buffer by which a load is driven. Hence, a transistor forming an output stage thereof is often designed to be large in size (i.e., designed to reduce a resistance). Consequently, it is likely that, though over a short period of time, the through current is increased to a large extent when the through current flows through the transistors T1 and T2 as illustrated in FIG. 11.

Figure 13:
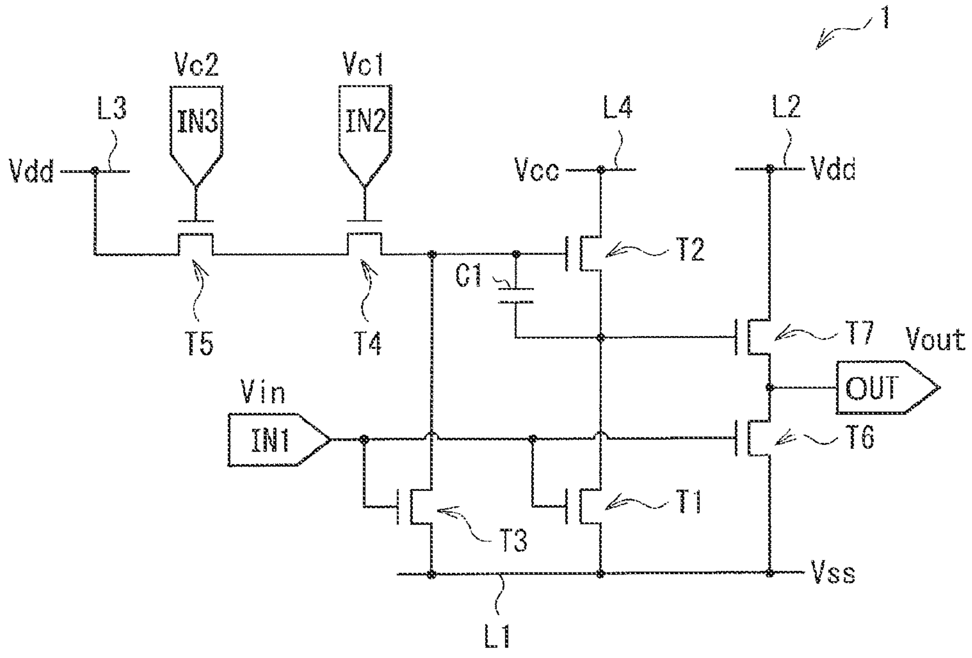
FIG. 13 is a circuit diagram illustrating a modification of the inverter circuit in FIG. 1.
Figure 14:
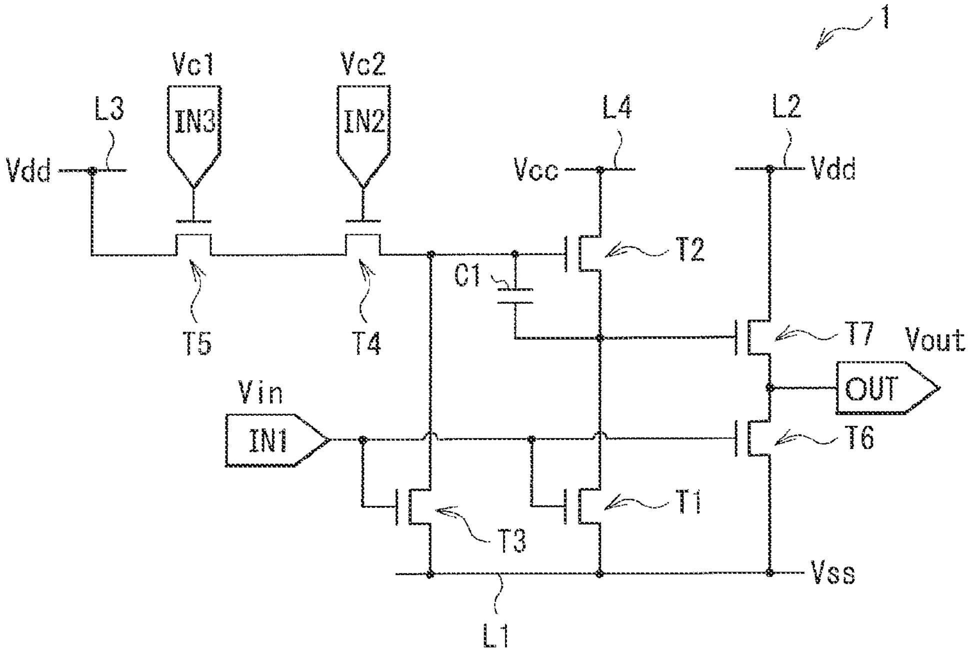
FIG. 14 is a circuit diagram illustrating a modification of the inverter circuit in FIG. 9.

To address this, it is preferable that transistors T6 and T7 be further provided in the output stage of any one of the inverter circuits illustrated in FIGS. 1 and 9, as illustrated in FIGS. 13 and 14, for example.

In the third modification, the transistor T2 may make and break electrical connection between a high voltage line L4 and a gate of the transistor T7, in response to a potential difference between the voltage of the source or the drain of the transistor T4 and a gate voltage of the transistor T7 (or to an equivalent thereto), for example. The gate of the transistor T2 is electrically connected to the source or the drain of the transistor T4. One of the source and the drain of the transistor T2 is electrically connected to the high voltage line L4, and the other of the source and the drain of the transistor T2 is electrically connected to the gate of the transistor T7.

The transistor T6 may make and break electrical connection between the output terminal OUT and the low voltage line L1, in response to a potential difference between the voltage of the input terminal IN1 and the voltage of the low voltage line L1 (or to an equivalent thereto), for example. A gate of the transistor T6 is electrically connected to the input terminal IN1. One of a source and a drain of the transistor T6 is electrically connected to the low voltage line L1, and the other of the source and the drain of the transistor T6 is electrically connected to the output terminal OUT.

The transistor T7 may make and break electrical connection between the high voltage line L2 and the output terminal OUT, in response to a potential difference between the gate voltage and the voltage of the output terminal OUT (or to an equivalent thereto), for example. The gate of the transistor T7 is electrically connected to a terminal of one of the source and the drain of the transistor T2 unconnected to the high voltage line L2. Also, one of the source and the drain of the transistor T7 is electrically connected to the high voltage line L2, and the other of the source and the drain of the transistor T7 is electrically connected to the output terminal OUT.

The high voltage line L4 is connected to an unillustrated power source that outputs a voltage (for example, a constant voltage) higher than the voltage of the high voltage line L2. The high voltage line L2 has, when the inverter circuit 1 is driven, a voltage Vcc. It is preferable that the voltage Vcc of the high voltage line L3 be higher than a voltage defined by Vdd+Vth7, where Vth7 is a threshold voltage of the transistor T7.

In one embodiment, the transistor T6 corresponds to a concrete (but not limitative) example of a “sixth transistor”. The transistor T7 corresponds to a concrete (but not limitative) example of a “seventh transistor”. The high voltage line L2 corresponds to a concrete (but not limitative) example of a “sixth voltage line”. The high voltage line L4 corresponds to a concrete (but not limitative) example of a “second voltage line”.

Figure 15:
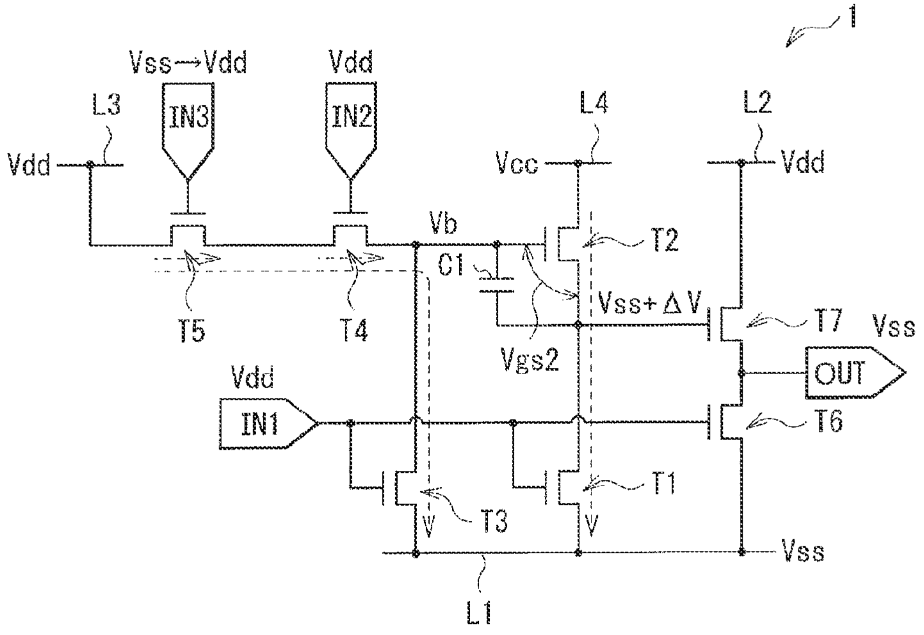
FIG. 15 is a circuit diagram for describing an example of an operation of the inverter circuit in FIG. 13.
Figure 16:
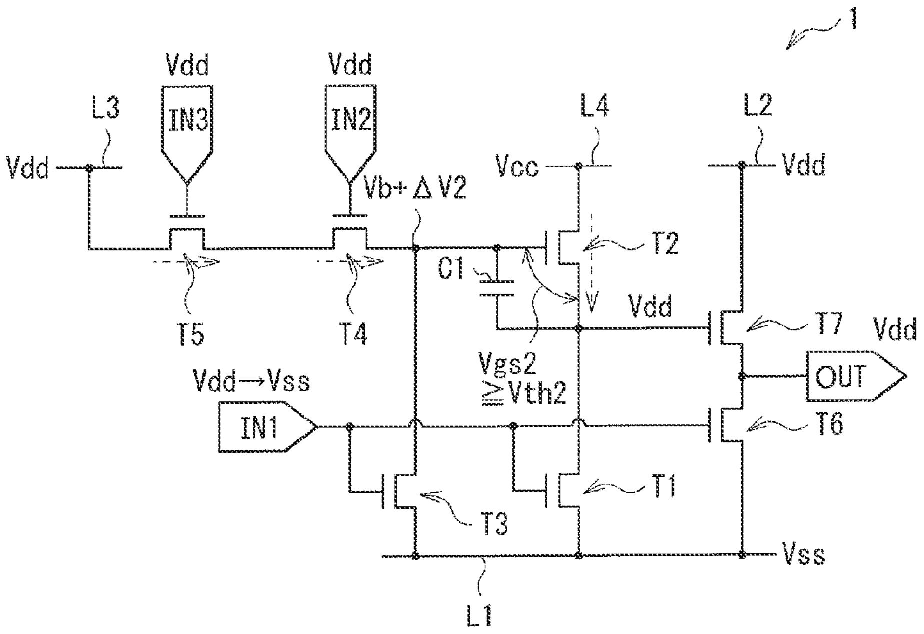
FIG. 16 is a circuit diagram for describing an example of an operation subsequent to that of FIG. 15.

FIGS. 15 and 16 illustrate an example of an operation of the inverter circuit 1 when the overlap time period described above is provided in the third modification.

As illustrated in FIG. 15, the voltage of the input terminal IN3 changes (i.e., rises) from the low level voltage Vss to the high level Vdd in the time period t4 during which the voltages of both the input terminals IN1 and IN2 have the high level voltage Vdd, and the time periods transit from the time period t4 to the time period t7. Thereby, a current flows from the high voltage line L3 to the low voltage line L1 through the transistors T3, T4, and T5, allowing the gate potential of the transistor T2 to be at the voltage Vb. Here, the voltage Vb is higher than the voltage defined by Vss+Vth2, allowing the transistor T2 to be turned on, and allowing a current to flow from the high voltage line L2 to the low voltage line L1. As a result, the output voltage Vout changes from the low level voltage Vss to the voltage defined by Vss+ΔV, where ΔV nearly equals to zero when the on-resistance of the transistor T1 is sufficiently smaller than the on-resistance of the transistor T2. Also, the through current does not flow to a final stage since ΔV is smaller than the threshold voltage of the transistor T7 and the transistor T7 is not turned on.

Immediately thereafter, the input voltage Vin changes (i.e., falls) from the high level voltage Vdd to the low level voltage Vss, and the time periods transit from the time period t7 to the time period t8. Thereby, the transistors T1, T3, and T6 are turned off. Here, the voltage Vgs2 between the gate and the source of the transistor T2 is equal to or higher than the threshold voltage Vth2, by which a current flows from the high voltage line L4 as illustrated in FIG. 16. As a result, the gate voltage of the transistor T2 rises not only by virtue of the writing involving the transistors T4 and T5 but also by virtue of the rising of the source voltage through the capacitor C1 (for example, rises by an amount corresponding to ΔV2 in the drawing). As a result of the rise in the gate voltage of the transistor T2, the gate voltage of the transistor T7 eventually reach the high level voltage Vdd. At this time, the transistor T7 turns on at a stage when the voltage between the gate and the source of the transistor T2 has become equal to or higher than the threshold voltage Vth7, and the high level voltage Vdd is outputted accordingly as the output voltage Vout.

It is to be noted that a transient property of the gate voltage of the transistor T7 can be increased in speed by allowing the voltage Vgs2 between the gate and the source of the transistor T2 to be equal to or higher than the threshold voltage Vth2. Further, the increase in speed of the transient property of the transistor T7 allows a transient property of the output voltage Vout to be increased in speed as well. As a result, this makes it possible to operate the inverter circuit 1 at high speed.

Also, the downstream stage of the inverter circuit 1 is provided with the transistors T6 and T7 through which the through current does not flow. This makes it possible to avoid the through current to be increased when a load is connected to the output terminal OUT of the inverter circuit 1. In addition, it is possible to eliminate the through current throughout the entire time periods in one embodiment where the overlap time period is not provided.

3. Second Embodiment

Hereinafter, a second embodiment of the technology will be described with reference to FIGS. 17 to 25. Note that the same or equivalent elements as those of the first embodiment described above may be denoted with the same reference numerals, and may not be described in detail.

[Configuration]

Figure 17:
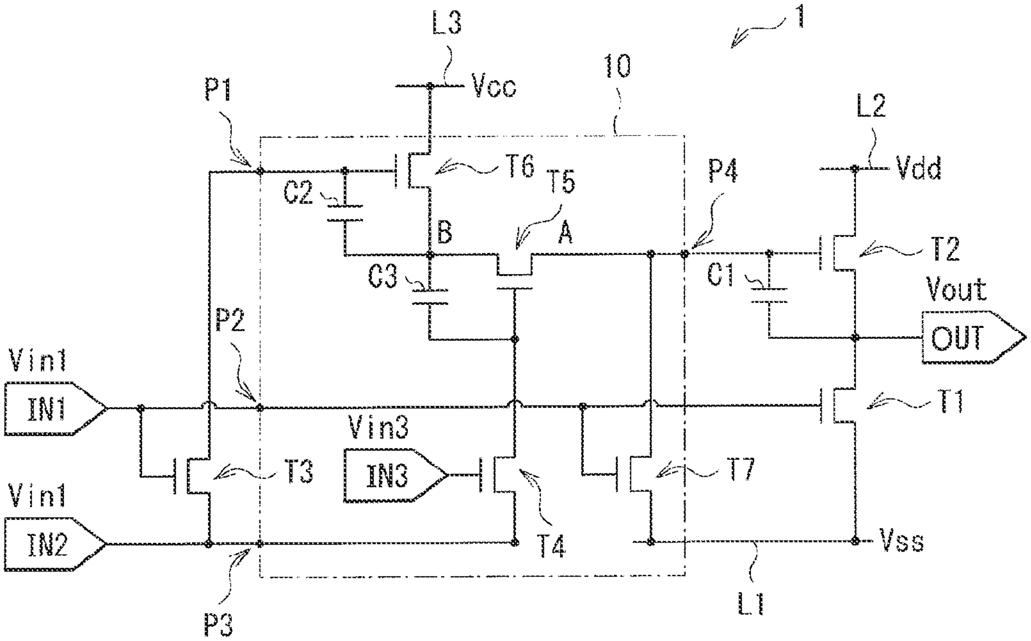
FIG. 17 is a circuit diagram illustrating an example of an inverter circuit according to a second embodiment of the technology.

FIG. 17 illustrates an example of an overall configuration of an inverter circuit 1 according to the second embodiment of the technology. The inverter circuit 1 substantially inverts a signal waveform of a pulse signal inputted to an input terminal IN (for example, (A) of FIG. 18), and outputs a pulse signal, whose waveform is the substantial inversion of the signal waveform inputted to the input terminal IN, from an output terminal OUT (for example, (D) of FIG. 18). The inverter circuit 1 may be preferably formed on such as amorphous silicon and an amorphous oxide semiconductor, and may have seven transistors T1 to T7 which are of the same channel type with respect to one another, for example. The inverter circuit 1, in addition to the seven transistors T1 to T7 mentioned previously, is provided with three capacitors C1, C2, and C3, three input terminals IN1, IN2, and IN3, and one output terminal OUT, and thus has a “7Tr3C” circuit configuration.

In one embodiment, the transistor T1 corresponds to a concrete (but not limitative) example of a “first transistor”. The transistor T2 corresponds to a concrete (but not limitative) example of a “second transistor”. The transistor T3 corresponds to a concrete (but not limitative) example of a “third transistor”. The transistor T4 corresponds to a concrete (but not limitative) example of a “fourth transistor”. The transistor T5 corresponds to a concrete (but not limitative) example of a “fifth transistor”. The transistor T6 corresponds to a concrete (but not limitative) example of a “sixth transistor”. The transistor T7 corresponds to a concrete (but not limitative) example of a “seventh transistor”. The capacitor C1 corresponds to a concrete (but not limitative) example of a “first capacitor”. The capacitor C2 corresponds to a concrete (but not limitative) example of a “second capacitor”. The input terminal IN1 corresponds to a concrete (but not limitative) example of a “first input terminal”. The input terminal IN2 corresponds to a concrete (but not limitative) example of a "second input terminal". The input terminal IN3 corresponds to a concrete (but not limitative) example of a "third input terminal". The output terminal OUT corresponds to a concrete (but not limitative) example of a "first output terminal".

The transistors T1 to T7 are thin-film transistors (TFT) which are of the same channel type with respect to one another. Each of the transistors T1 to T7 may be a thin-film transistor of an n-channel MOS (Metal Oxide Semiconductor) type, for example.

The transistor T1 may make and break electrical connection between the output terminal OUT and a low voltage line L1, in response to a potential difference between a voltage of the input terminal IN1 (hereinafter referred to as an "input voltage Vin1") and a voltage Vss of the low voltage line L1 (or to an equivalent thereto), for example. A gate of the transistor T1 is electrically connected to the input terminal IN1. A source or a drain of the transistor T1 is electrically connected to the low voltage line L1, and a terminal of one of the source and the drain of the transistor T1 unconnected to the low voltage line L1 is electrically connected to the output terminal OUT.

The transistor T2 may make and break electrical connection between a high voltage line L2 and the output terminal OUT, in response to a potential difference between a voltage of a terminal of one of a source and a drain of the transistor T5 unconnected to the transistor T6 (hereinafter referred to as a "terminal A") and a voltage of the output terminal OUT (hereinafter referred to as an "output voltage Vout") (or to an equivalent thereto), for example. A gate of the transistor T2 is electrically connected to the terminal A of the transistor T5. A source or a drain of the transistor T2 is electrically connected to the output terminal OUT, and a terminal of one of the source and the drain of the transistor T2 unconnected to the output terminal OUT is electrically connected to the high voltage line L2.

The transistor T3 may make and break electrical connection between a gate of the transistor T6 and the input terminal IN2, in response to a potential difference between the input voltage Vin1 and a voltage of the input terminal IN2 (hereinafter referred to as an "input voltage Vin2") (or to an equivalent thereto), for example. A gate of the transistor T3 is electrically connected to the input terminal IN1. A source or a drain of the transistor T3 is electrically connected to the input terminal IN2, and a terminal of one of the source and the drain of the transistor T3 unconnected to the input terminal IN2 is electrically connected to the gate of the transistor T6.

The transistor T4 may make and break electrical connection between a gate of the transistor T5 and the input terminal IN2, in response to a potential difference between a voltage of the input terminal IN3 (hereinafter referred to as an "input voltage Vin3") and the input voltage Vin2 (or to an equivalent thereto), for example. A gate of the transistor T4 is electrically connected to the input terminal IN3. A source or a drain of the transistor T4 is electrically connected to a gate of the transistor T5, and a terminal of one of the source and the drain of the transistor T4 unconnected to the gate of the transistor T5 is electrically connected to the input terminal IN2.

The transistor T5 may make and break electrical connection between a source or a drain of the transistor T6 (hereinafter referred to as a "terminal B") and the gate of the transistor T2, in response to a gate voltage of the transistor T5, for example. The gate of the transistor T5 is electrically connected to a terminal of one of the source and the drain of the transistor T4 unconnected to the input terminal IN2. The terminal A of the transistor T5 is electrically connected to the gate of the transistor T2, and a terminal of one of the source and the drain of the transistor T5 different from the terminal A is electrically connected to the terminal B of the transistor T6.

The transistor T6 may make and break electrical connection between the high voltage line L3 and the terminal B, in response to a potential difference between a gate voltage of the transistor T6 and the terminal B (or to an equivalent thereto), for example. The gate of the transistor T6 is electrically connected to a terminal of one of the source and the drain of the transistor T3 unconnected to the input terminal IN2. The terminal B of the transistor T6 is electrically connected to a terminal of one of the source and the drain of the transistor T5 different from the terminal A, and a terminal of one of the source and the drain of the transistor T6 different from the terminal B is electrically connected to the high voltage line L3.

The transistor T7 may make and break electrical connection between the gate of the transistor T2 and the low voltage line L1, in response to a potential difference between the input voltage Vin1 and a voltage of the low voltage line L1 (or to an equivalent thereto), for example. A gate of the transistor T7 is electrically connected to the input terminal IN1. A source or a drain of the transistor T7 is connected to the gate of the transistor T2, and a terminal of one of the source and the drain of the transistor T7 unconnected to the gate of the transistor T2 is electrically connected to the low voltage line L1.

In one embodiment, the low voltage line L1 corresponds to a concrete (but not limitative) example of a "first voltage line" and a "fourth voltage line". The high voltage line L2 corresponds to a concrete (but not limitative) example of a "second voltage line". The high voltage line L3 corresponds to a concrete (but not limitative) example of a "third voltage line". The terminal B of the transistor T6 corresponds to a concrete (but not limitative) example of a "first terminal".

Each of the high voltage lines L2 and L3 is connected to an unillustrated power source that outputs a voltage (for example, a constant voltage) higher than the voltage of the low voltage line L1. The high voltage line L2 has, when the inverter circuit 1 is driven, the voltage Vdd at a high level. The high voltage line L3 has, when the inverter circuit 1 is driven, a voltage Vcc which is higher than the high level voltage Vdd. It is preferable that the voltage Vcc of the high voltage line L3 be higher than a voltage defined by Vdd+Vth2, where Vth2 is a threshold voltage of the transistor T2. On the other hand, the low voltage line L1 is connected to an unillustrated power source that outputs a voltage (for example, a constant voltage) lower than the voltages of the high voltage lines L2 and L3. The low voltage line L1 has, when the inverter circuit 1 is driven, the voltage Vss at a low level (<Vdd).

Figure 18:
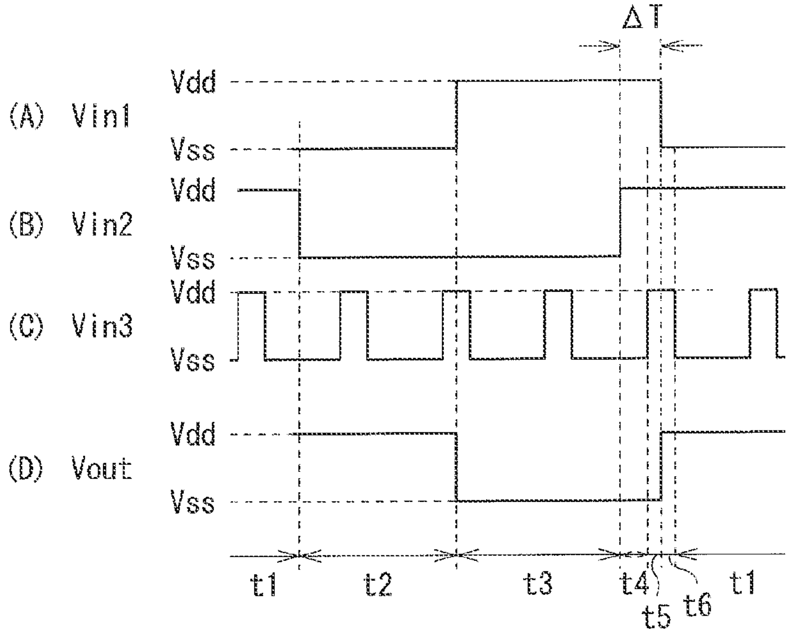
FIG. 18 is a waveform chart illustrating examples of waveforms of input and output signals in the inverter circuit in FIG. 17.

The input terminal IN2 is connected to an unillustrated power source S1 that outputs a predetermined pulse signal. The input terminal IN3 is connected to an unillustrated power source S2 that outputs a predetermined pulse signal. As illustrated in Part (B) of FIG. 18, the power source S1 may output the low level voltage Vss as a control signal, during a predetermined time period from rising of the input voltage Vin1 up to falling of the input voltage Vin1, for example. Part (B) of FIG. 18 illustrates an example where the power source S1 outputs the low level voltage Vss as the control signal, for a time period longer than a time period during which the input voltage Vin1 continuously has the high level voltage Vdd. Also, as illustrated in Part (B) of FIG. 18, the power source S1 may output the high level voltage Vdd as the control signal during a time period other than the time period described above, i.e., during a predetermined time period including a time point at which the input voltage Vin1 falls.

On the other hand, as illustrated in Part (C) of FIG. 18, the power source S2 may output, as a control signal, the pulse signal in which the high level voltage Vdd and the low level voltage Vss are repeated alternately, with a period shorter than the time period during which the input voltage Vin continuously has the high level voltage Vdd. The power source S2 outputs a signal that controls a gate voltage of the transistor T2, in order to allow the transistor T2 not to be turned on throughout a time period during which the input voltages Vin1 and Vin2 both have the high level voltage Vdd. For example, the power source S2 may output the high level voltage Vdd in a time period which is a part of the time period (a time period ΔT) during which the input voltages Vin1 and Vin2 both have the high level voltage Vdd, and outputs the low level voltage Vss in a time period other than that time period in the time period ΔT, as illustrated in Part (C) of FIG. 18.

Also, the power source S2 may so output the control signal as to allow the time period during which the high level voltage Vdd is outputted to include the time point at which the input voltage Vin1 falls, as illustrated in Part (C) of FIG. 18, for example. For example, the power source S2 may output a pulse whose crest value is the high level voltage Vdd, immediately before the falling of the input voltage Vin1, as illustrated in Part (C) of FIG. 18. More specifically, the power source S2 outputs the pulse whose crest value is the voltage Vdd during the predetermined time period including the time point at which the input voltage Vin1 falls from the high level voltage Vdd to the low level voltage Vss, and does not output other pulse during the time period ΔT (for example, to output the low level voltage Vss), as illustrated in Part (C) of FIG. 18, for example.

The capacitor C1 is inserted between the gate of the transistor T2 and a terminal of one of the source and the drain of the transistor T2 unconnected to the high voltage line L2 (for example, a terminal of the transistor T2 connected to the output terminal OUT). A capacity of the capacitor C1 has a value by which the gate of the transistor T2 is charged at a voltage higher than that defined by Vss+Vth2, when the falling voltage is supplied to the input terminal IN1 and the transistors T1 and T7 are turned off, where Vth2 is the threshold voltage of the transistor T2. The capacitor C2 is inserted between the gate of the transistor T6 and the terminal B of the transistor T6. The capacitor C3 is inserted between the gate of the transistor T5 and a terminal of one of the source and the drain of the transistor T5 connected to the terminal B of the transistor T6.

It is to be noted that the inverter circuit 1 may be equivalent to that in which a control device 10, the transistor T3, and the capacitor C1 are inserted between the transistors T1 and T2 in an output stage and the input terminal IN1, in connection with such as the inverter circuit 20 according to a comparative example illustrated in FIG. 34. As illustrated in FIG. 17, the control device 10 may include four transistors T4 to T7, two capacitors C2 and C3, and one input terminal IN3, for example.

The control device 10 may have four terminals P1 to P4 and the input terminal IN3, as illustrated in FIG. 17, for example. The terminal P1 is electrically connected to the gate of the transistor T6, the terminal P2 is electrically connected to the input terminal IN1, and the terminal P3 is electrically connected to the input terminal IN2. The terminal P4 is electrically connected to the gate of the transistor T2. In other words, for the control device 10, the three terminals P1 to P3 are equivalent to or each serve as an input terminal. Also, for the control device 10, the terminal P4 is equivalent to or serves as an output terminal. It is to be noted that the four terminals P1 to P4 are conceptual and do not refer to physical terminals when the control device 10 is defined conceptually as a specific functional block in the inverter circuit 1.

In one embodiment, the control device 10 corresponds to a concrete (but not limitative) example of a "control device". The terminal P1 corresponds to a concrete (but not limitative) example of a "fourth input terminal". The terminal P4 corresponds to a concrete (but not limitative) example of a "second output terminal".

The control device 10, by an on and off operation of the transistors T4 to T7 which is based on the input voltages Vin1 and Vin2 and on a voltage of the input terminal IN3 (hereinafter referred to as an "input voltage Vin3"), controls turning on and off of the transistors T1 and T2 in the output stage. For example, the control device 10 outputs a voltage by which the transistor Tr2 is turned on from the terminal P4, only when the input voltage Vin3 has the high level voltage Vdd during the time period in which the input voltages Vin1 and Vin2 both have the high level voltage Vdd, as illustrated in FIG. 18. More specifically, as illustrated in FIG. 18, the control device 10 may output the pulse by which the transistor T2 is turned on from the terminal P4 during the predetermined time period including the time point at which the input voltage Vin1 falls from the high level voltage Vdd to the low level voltage Vss, and may not output other pulse during the time period ΔT (for example, to output from the terminal P4 a voltage by which the transistor T2 is turned off).

[Operation]

An example of an operation of the inverter circuit 1 will now be described with reference to FIGS. 19 to 24. FIGS. 19 to 24 are circuit diagrams illustrating an example of a series of operations of the inverter circuit 1.

Figure 19:
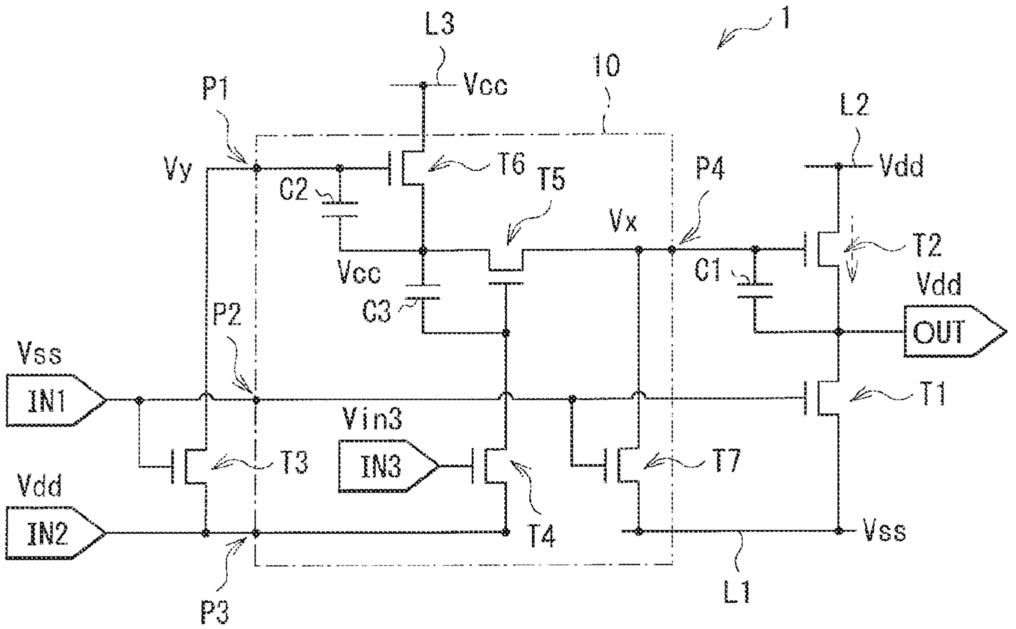
FIG. 19 is a circuit diagram for describing an example of an operation of the inverter circuit in FIG. 17.

First, referring to FIG. 19, the input voltage Vin has the low level voltage Vss and the transistors T1, T3, and T7 are turned off in a time period t1. Also, in the time period t1, the high level voltage Vdd is applied as the control signal to the input terminal IN2. Further, in the time period t1, the pulse signal in which the high level voltage Vdd and the low level voltage Vss are repeated alternately with a short period is applied as the control signal to the input terminal IN3.

At this time, as illustrated in FIG. 19, a gate potential of the transistor T2 is at Vx which is higher than the voltage defined by Vdd+Vth2, thereby allowing the transistor T2 to be turned on and allowing the voltage Vdd to be outputted as the output voltage Vout. Also, the gate voltage of the transistor T6 has a potential Vy, and a gate-source voltage of the transistor T6 is higher than a threshold voltage Vth6, by which a source voltage of the transistor T6 has the voltage Vdd. Thus, the gate-source voltage provided to the transistor T5 fails to exceed a threshold voltage of the transistor T4, allowing the transistor T5 not to be turned on and allowing the gate voltage of the transistor T2 to retain the voltage Vx.

Figure 20:
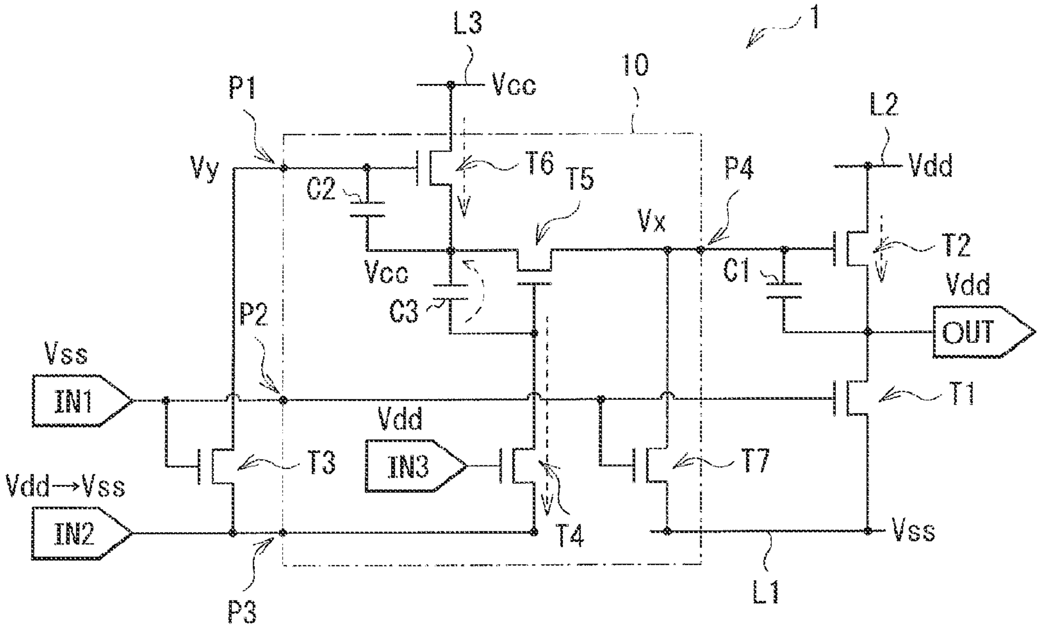
FIG. 20 is a circuit diagram for describing an example of an operation subsequent to that of FIG. 19.

Then, as illustrated in FIG. 20, the input voltage Vin2 changes (i.e., falls) from the high level voltage Vdd to the low level voltage Vss, and the time periods transit from the time period t1 to a time period t2. Here, the input voltage Vin1 has the low level voltage Vss, by which the transistor Tr3 is kept off. When the input voltage Vin3 has changed to have the high level voltage Vdd in the time period t2, the gate voltage of the transistor T5 changes to the low level voltage Vss, an amount of which (i.e., a voltage change amount) is supplied to the source of the transistor T6 through the capacitor C3 to vary the source voltage of the transistor T6. However, the capacitor C2 is connected between the gate and the source of the transistor, by which the gate-source voltage of the transistor T6 remains unchanged, and the source voltage of the transistor T6 reaches the high level voltage Vdd following an elapse of a predetermined time period. Also, the transistor T5 is kept off even when the gate voltage of the transistor T5 has changed to have the low level voltage Vss. Hence, the gate potential of the transistor T2 is at the Vx, and the output voltage Vout remains to have the high level voltage Vdd.

Figure 21:
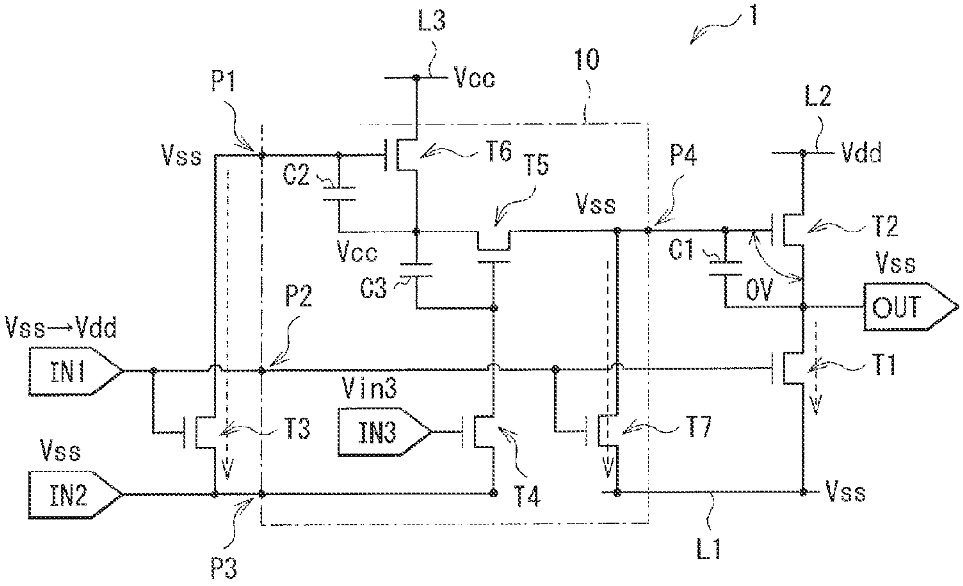
FIG. 21 is a circuit diagram for describing an example of an operation subsequent to that of FIG. 20.

Then, as illustrated in FIG. 21, the input voltage Vin1 changes (i.e., rises) from the low level voltage Vss to the high level voltage Vdd, and the time periods transit from the time period t2 to a time period t3. Thereby, the transistors T1, T3, and T4 are turned on, and the gate of the transistor T2 and the output terminal OUT are charged at the voltage Vss, and the transistor T2 is turned off. Here, the input voltage Vin2 has the voltage Vss, and thus the gate voltage of the transistor T6 also has the voltage Vss. Further, even though the input voltage Vin3 repeats to have alternately the high level voltage Vdd and the low level voltage Vss also in the time period t3, a voltage value of each node does not change thereby.

Figure 22:
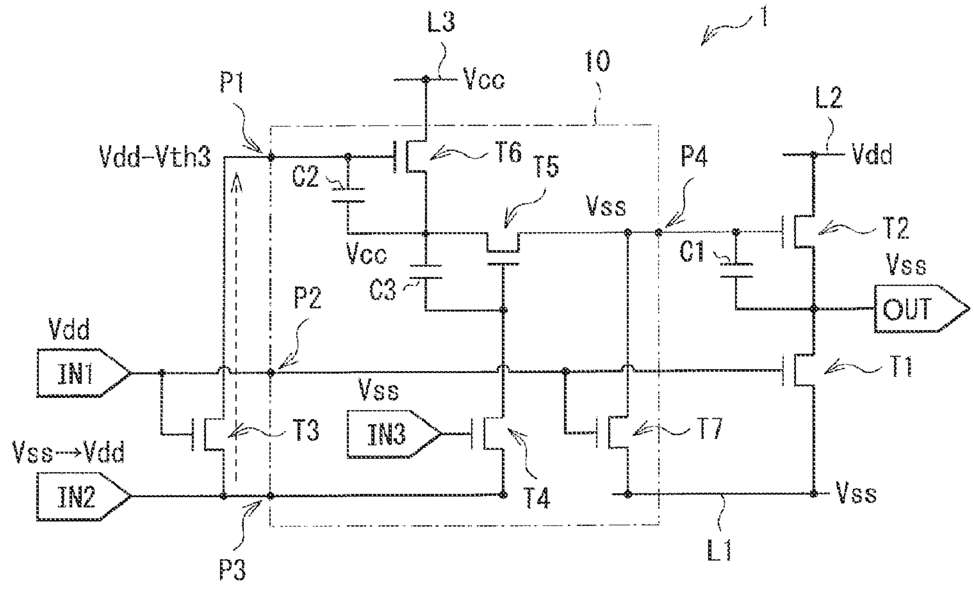
FIG. 22 is a circuit diagram for describing an example of an operation subsequent to that of FIG. 21.

Following an elapse of a predetermined time period, as illustrated in FIG. 22, the input voltage Vin2 changes (i.e., rises) from the low level voltage Vss to the high level Vdd when the input voltage Vin1 and the input voltage Vin3 have the high level voltage Vdd and the low level voltage Vss, respectively, and the time periods transit from the time period t3 to a time period t4. Here, a current flows through the transistor T3 from the input voltage Vin2, and the gate voltage of the transistor T6 increases from the low level voltage Vss. The gate voltage of the transistor T6 reaches a potential defined by Vdd−Vth3 following an elapse of a predetermined time period, where Vth3 is a threshold voltage of the transistor T3.

Figure 23:
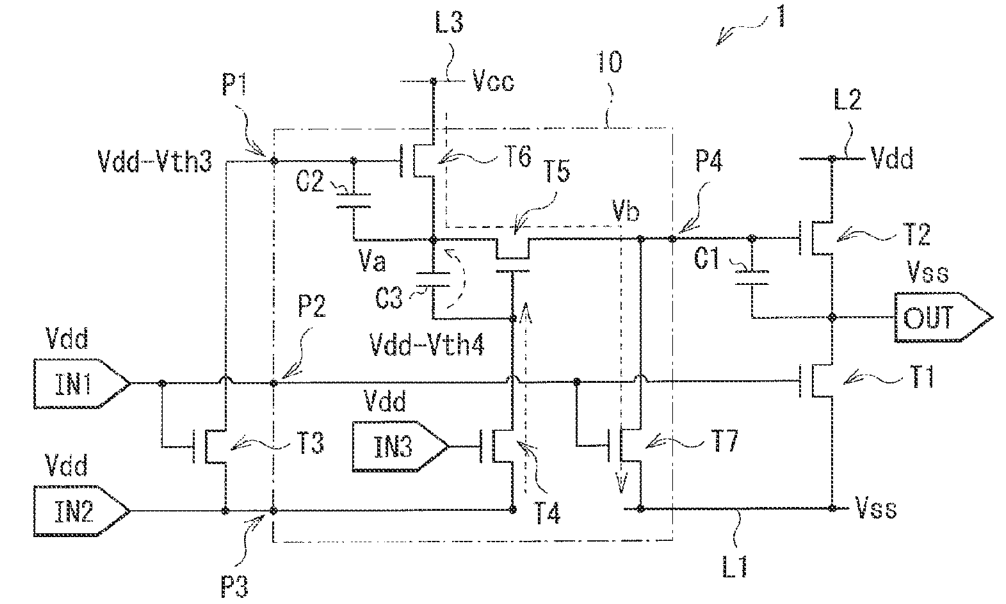
FIG. 23 is a circuit diagram for describing an example of an operation subsequent to that of FIG. 22.

Then, as illustrated in FIG. 23, the input voltage Vin3 changes (i.e., rises) from the low level voltage Vss to the high level voltage Vdd, and the time periods transit from the time period t4 to a time period t5. Thereby, the transistor T4 is turned on, and the gate voltage of the transistor T5 is changed to have a voltage defined by Vdd−Vth4, where Vth4 is a threshold voltage of the transistor T4. Here, the input voltage Vin1 has the high level voltage Vdd. Hence, the transistor T7 is on and the gate voltage of the transistor T2 has the low level voltage Vss, allowing the transistor T5 to be turned on.

As a result, a through current flows from the high voltage line L3 through the transistors T6, T5, and T7, and, following an elapse of a predetermined time period, the source voltage of the transistor T6 reaches a voltage Va, and the gate voltage of the transistor T2 reaches a voltage Vb. Here, a current does not flow from the high voltage line L2 to the low voltage line L1 when the gate-source voltage of the transistor T2 (Vb−Vss) is lower than the threshold voltage Vth2 of the transistor T2. At this time, it is to be noted that a change in the gate voltage of the transistor T5 is provided to the source of the transistor T6 through the capacitor C3. However, the change in the source voltage of the transistor T6 does not influence the driving since the transistors T5 and T7 are turned on as described above.

Figure 24:
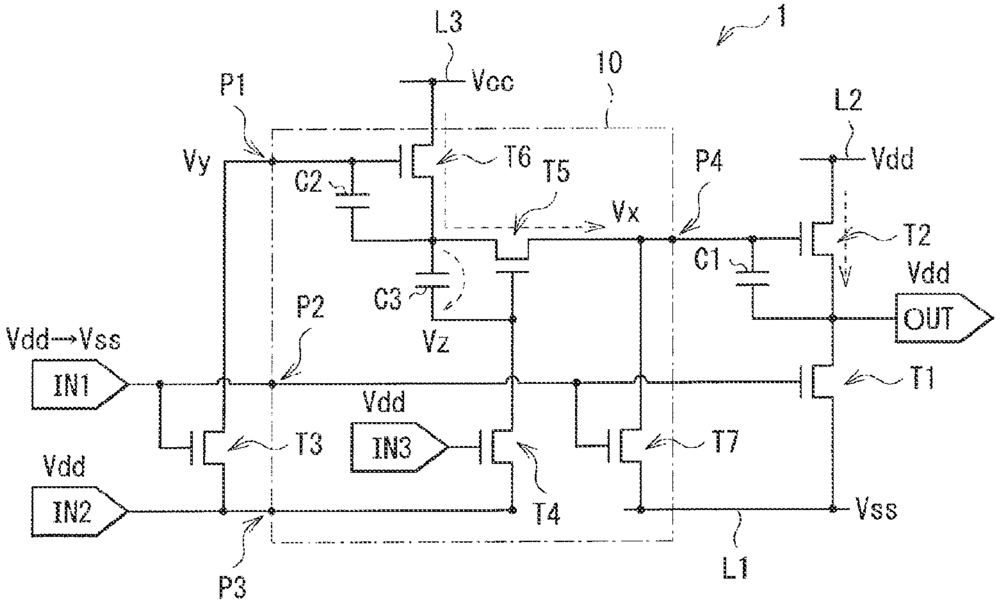
FIG. 24 is a circuit diagram for describing an example of an operation subsequent to that of FIG. 23.
Figure 25:
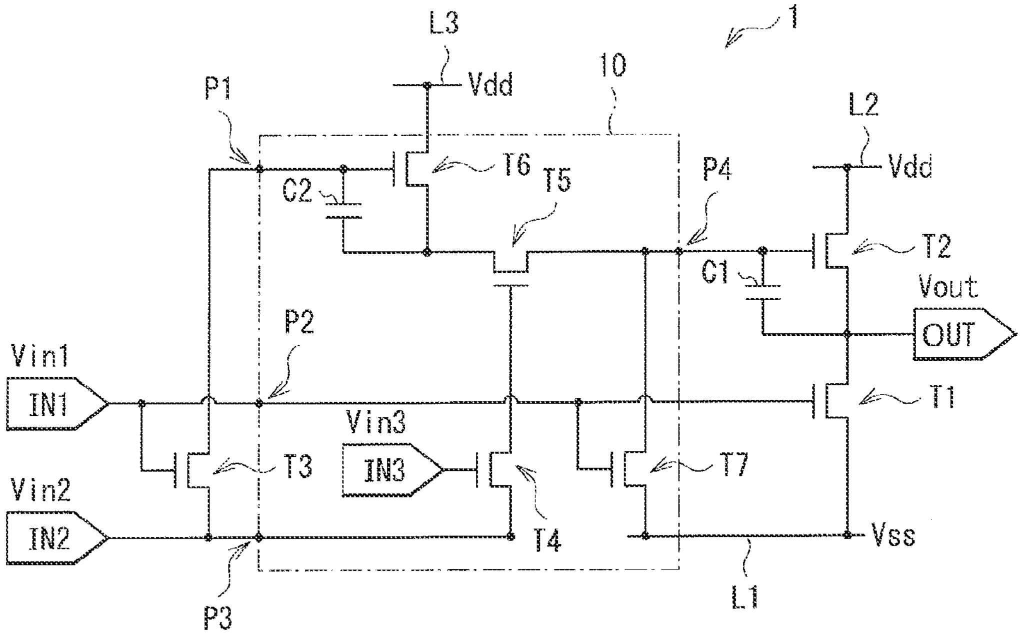
FIG. 25 is a circuit diagram illustrating a modification of the inverter circuit in FIG. 17.

Then, as illustrated in FIG. 24, the input voltage Vin1 eventually changes (i.e., falls) from the high level voltage Vdd to the low level voltage Vss, and the time periods transit from the time period t5 to a time period t6. Thereby, the transistors T3 and T7 are turned off. Here, a current flows from the high voltage line L3 through the transistors T6, T5, and T7 to thereby increase the source voltage of the transistor T6 and the gate voltage of the transistor T2. The change in the source voltage of the transistor T6 is provided to the gate voltage of the transistor T5 through the capacitor C3, by which the gate voltage of the transistor T5 increases to reach a voltage Vz. Also, when the gate voltage of the transistor T2 exceeds the voltage defined by Vss+Vth2, the gate-source voltage of the transistor T2 becomes higher than the threshold voltage Vth2, allowing the transistor T2 to be turned on. As a result, a current flows from the high voltage line L2 to the transistor T2, by which the source voltage of the transistor T2 (the output voltage Vout) starts to rise. Here, the capacitor C1 is connected between the gate and the source of the transistor T2. Hence, the gate voltage of the transistor T2 also rises by virtue of the rising of the source voltage. When the gate voltage of the transistor T2 becomes higher than a voltage defined by Vz−Vth5, the transistor T5 is turned off, by which the gate voltage of the transistor T2 continues to rise only by virtue of the increase in the source voltage through the capacitor C1. The gate voltage of the transistor T2 eventually reach a voltage Vx, and the high level voltage Vdd is outputted as the output voltage Vout.

Thus, in the inverter circuit 1 according to the present embodiment, the pulse signal (for example, (D) of FIG. 18), whose waveform is the substantial inversion of the signal waveform inputted to the input terminal IN1 (for example, (A) of FIG. 18), is outputted from the output terminal OUT in the manner described above.

[Effect]

Referring to FIG. 32, an inverter circuit 10 according to a comparative example has a circuit configuration of a single channel type, in which two n-channel MOS transistors T10 and T20 are connected in series, for example. In this inverter circuit 10, an output voltage Vout may not have a voltage Vdd but may have a voltage defined by Vdd−Vth when an input voltage Vin has a voltage Vss, as illustrated in FIG. 33, for example. In other words, the output voltage Vout includes a threshold voltage Vth of the transistor T20. Hence, the output voltage Vout may be influenced heavily by the variation in the threshold voltage Vth of the transistor T20.

To address this, a measure may be contemplated in which a gate and a drain of the transistor T20 may be electrically isolated, and the gate may be connected to a positive voltage line L30 to which a voltage Vss2 higher than the voltage Vdd of the drain (=Vdd+Vth) is applied, as illustrated in FIG. 34 which illustrates an inverter circuit 20 according to a comparative example, for example. Also, a measure may be contemplated in which a bootstrap circuit configuration is employed, as illustrated in FIG. 35 which illustrates an inverter circuit 30 according to a comparative example, for example.

In each of the circuits illustrated in FIGS. 32, 34, and 35, however, a current (for example, a through current) may flow from the positive voltage line L20 to the negative voltage line L10 through the transistors T10 and T20, during when the input voltage Vin is at a high level, i.e., until when the output voltage Vout is at a low level. As a result, a power consumption in the inverter circuit may become large.

In contrast, in the inverter circuit 1 according to the present embodiment, the input voltage Vin2 is supplied to the gate of the transistor T2 through the transistor T3 and the control device 10 which are turned on and off in response to the voltage applied from the input terminal IN1. Thus, the on-voltage is applied to the gate of each of the transistor T1 and the transistor T2, only when the input voltage Vin3 has (or stays at) the high level voltage Vdd during the time period in which both the input voltage Vin1 and the input voltage Vin2 have (or stay at) the high level voltage Vdd. In other words, the time period during which the transistors T1 and T2 are turned on together is controllable by the input voltage Vin3. Hence, it is possible to keep the power consumption low as compared with such as the inverter circuits described in FIGS. 32, 34, and 35.

4. Modifications

In the embodiment described above, the capacitor C3 is provided between the gate and the drain of the transistor T5. This may allow the rise in the source voltage of the transistor T6 to be provided to the gate of the transistor T5 through the capacitor C3, making the gate voltage of the transistor T5 to be higher than the voltage defined by Vdd+Vth5. Hence, when the high voltage line L3 connected to the drain of the transistor T6 is replaced by the high voltage line L2, the transistor T5 may be turned on during the time period t6, causing the gate voltage of the transistor T2 to have the high level voltage Vdd. This may prevent the output voltage Vout from having the high level voltage Vdd.

To address this, the capacitor C3 may be eliminated and the high voltage line L3 may be replaced by the high voltage line L2 in the embodiment described above, as illustrated in FIG. 25. In the present modification, the increase in the source voltage of the transistor T6 is not provided to the gate of the transistor T5, and the gate voltage of the transistor T5 has a voltage defined by Vdd−Vth5 (<Vdd). Hence, the transistor T5 is turned off when the gate voltage of the transistor T2 and the source voltage of the transistor T6 exceed a voltage defined by Vdd−Vth4−Vth5. This makes it possible to increase the gate voltage of the transistor T2 to be higher than the voltage defined by Vdd+Vth2 during the time period t6 consequently, and to output the voltage Vdd as the output voltage Vout.

5. Application Examples

Figure 26:
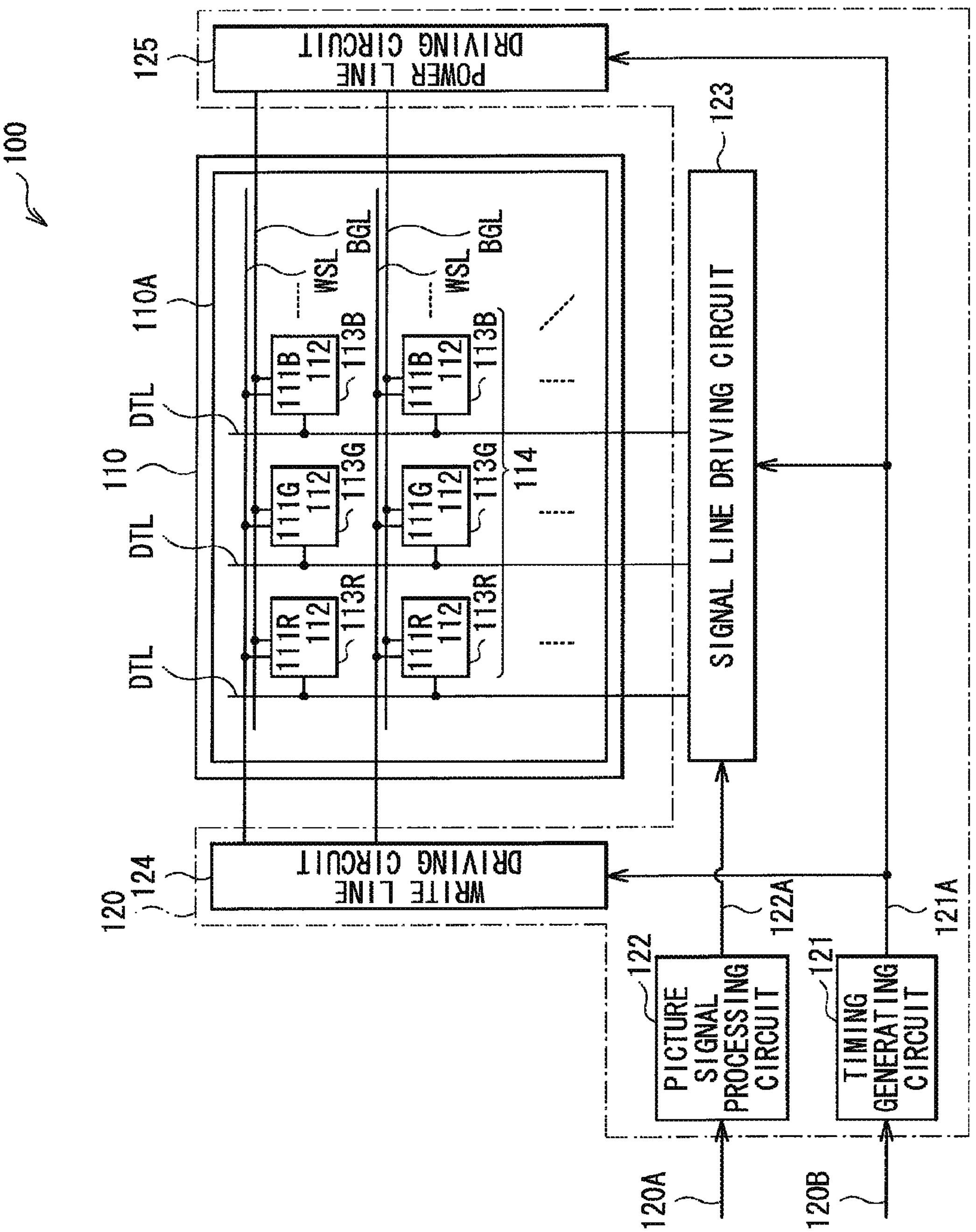
FIG. 26 illustrates a schematic configuration of a display unit as an example of application of the inverter circuit according to any one of the embodiments and the modifications.

FIG. 26 illustrates an example of an overall configuration of a display unit 100 serving as one of application examples of the inverter circuit 1 according to any one of the embodiments and the modifications described above. The display unit 100 may include a display panel 110 and a drive circuit 120 by which the display panel 110 is driven, for example. In one embodiment, the display panel 110 corresponds to a concrete (but not limitative) example of a "display section". The drive circuit 120 corresponds to a concrete (but not limitative) example of a "drive section".

[Display Panel 110]

The display panel 110 has a display region 110A in which a plurality of display pixels 114 are two-dimensionally arranged. The display panel 110 displays a picture in the display region 110A by virtue of each of the display pixels 114 driven by the drive circuit 120. Each of the display pixels 114 may include three pixels 113R, 113G, and 113B which are adjacent to one another. In the following, the term "pixel 113" is used as a generic term to collectively refer to the respective pixels 113R, 113G, and 113B where appropriate.

The pixel 113R includes an organic EL device 111R and a pixel circuit 112. The pixel 113G includes an organic EL device 111G and a pixel circuit 112. The pixel 113B includes an organic EL device 111B and a pixel circuit 112. The organic EL device 111R serves as an organic EL device that emits red light. The organic EL device 111G serves as an organic EL device that emits green light. The organic EL device 11B serves as an organic EL device that emits blue light. In the following, the term "organic EL device 111" is used as a generic term to collectively refer to the respective organic EL devices 111R, 111G, and 111B where appropriate.

Figure 27:
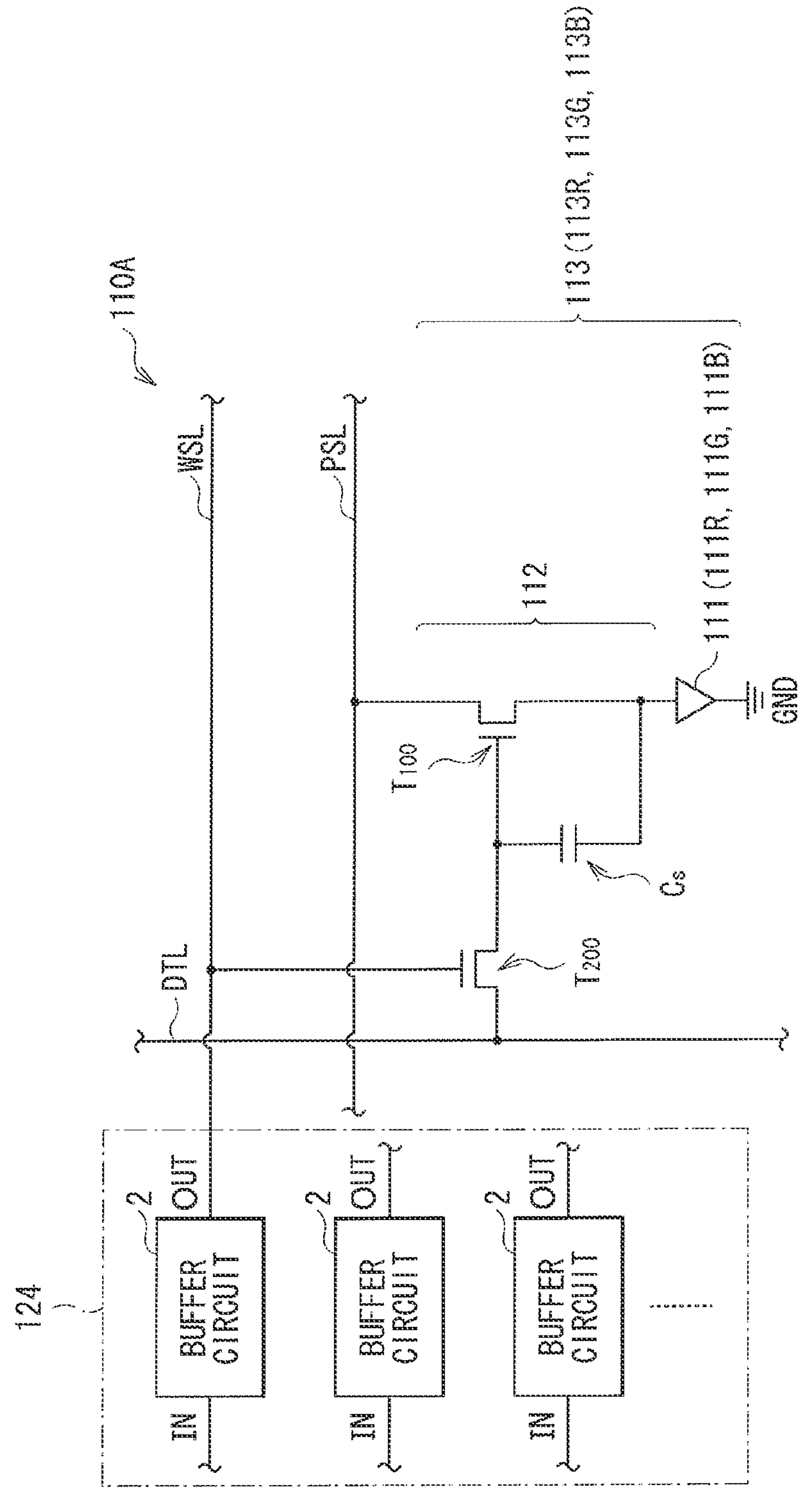
FIG. 27 is a circuit diagram illustrating an example of a write line driving circuit and a pixel circuit in FIG. 26.

FIG. 27 illustrates an example of a circuit configuration in the display region 110A and an example of a later-described write line driving circuit 124. The display region 110A has a configuration in which the plurality of pixel circuits 112 and the plurality of organic EL devices 111 are two-dimensionally arranged in pairs. Each of the pixel circuits 112 may include: a drive transistor T100 by which a current flowing to the organic EL device 111 is controlled; a write transistor T200 by which a voltage of a signal line DTL is written to the drive transistor T100; and a holding capacitor Cs, and thus has a "2Tr1C" circuit configuration, for example. The drive transistor T100 and the write transistor T200 each may be configured by an n-channel MOS thin-film transistor (TFT), for example. In one embodiment, the drive transistor T100 or the write transistor T200 may be configured by a p-channel MOS TFT, for example.

In the display region 110A, a plurality of write lines WSL are arranged in rows, and a plurality of signal lines DTL are arranged in columns. In one embodiment, the write line WSL corresponds to a concrete (but not limitative) example of a "scan line". Further, a plurality of power lines PSL (a member to which a power source voltage is supplied) are arranged in rows along the write lines WSL in the display region 110A. Each portion near an intersection of each of the signal lines DTL and each of the write lines WSL is provided with one organic EL device 111. The signal lines DTL are each connected to an output end of a later-described signal line driving circuit 123 and to an electrode of one of a drain electrode and a source electrode of the write transistor T200. The write lines WSL are each connected to an output end of a later-described write line driving circuit 124 and to a gate electrode of the write transistor T200. The power lines PSL are each connected to an output end of a later-described power line driving circuit 125 and to an electrode of one of a drain electrode and a source electrode of the drive transistor T100. An electrode of one of the drain electrode and the source electrode of the write transistor T200 unconnected to the signal line DTL is connected to a gate electrode of the drive transistor T100 and to one end of the holding capacitor Cs. An electrode of one of the drain electrode and the source electrode of the drive transistor T100 unconnected to the power line PSL as well as the other end of the holding capacitor Cs are connected to an unillustrated anode electrode of the organic EL device 111. A cathode electrode of the organic EL device 111 may be connected to a ground line GND, for example.

[Drive Circuit 120]

Figure 28:
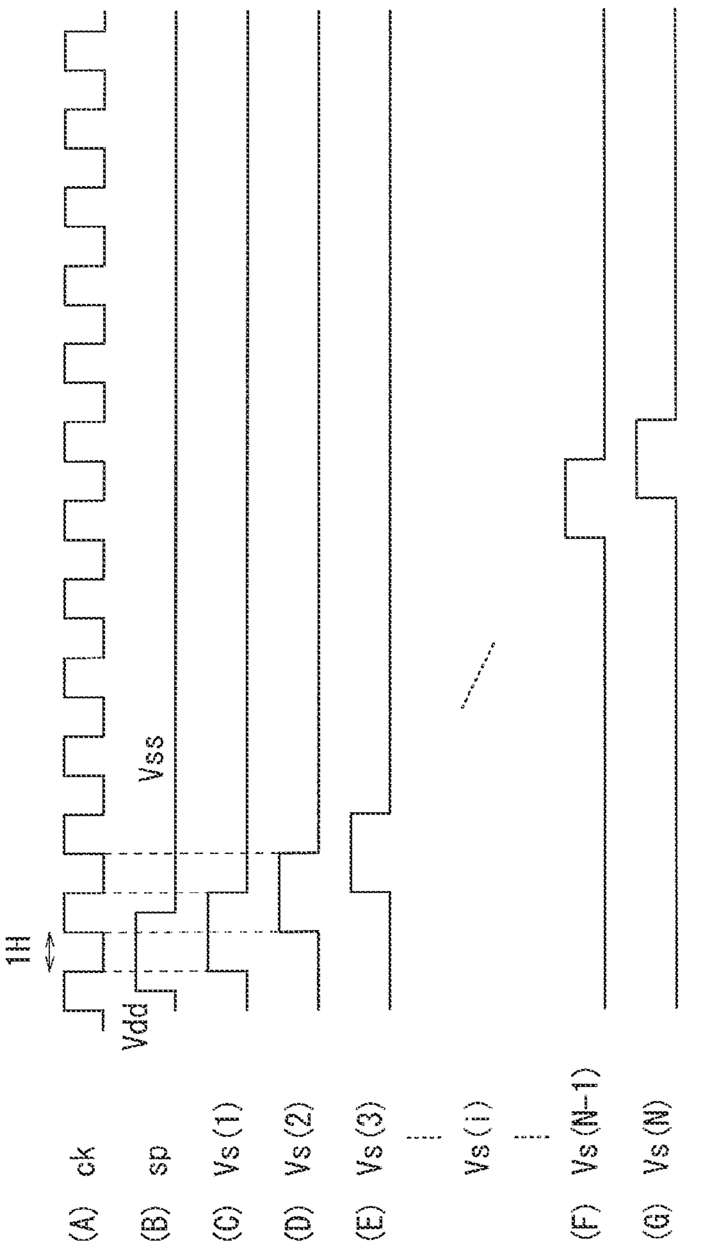
FIG. 28 is a waveform chart illustrating examples of waveforms of a synchronization signal and signals applied to write lines.

Respective circuits in the drive circuit 120 will now be described with reference to FIGS. 26, 27, and 28. FIG. 28 illustrates examples of waveforms of a synchronization signal and signals outputted from the drive circuit 120 to each of the write lines WSL. The drive circuit 120 is provided with a timing generating circuit 121, a picture signal processing circuit 122, the signal line driving circuit 123, the write line driving circuit 124, and the power line driving circuit 125. Also, the drive circuit 120 is provided with the power source (for example, the power source connected to the low voltage line L1 and such as to the high voltage lines L2, L3, and L4, or such as to the high voltage lines L2 and L3) according to any one of the embodiments and the modifications described above.

The timing generating circuit 121 so controls the picture signal processing circuit 122, the signal line driving circuit 123, the write line driving circuit 124, and the power line driving circuit 125 as to allow them to operate in conjunction with one another. The timing generating circuit 121 may output a control signal 121A to each of the circuits described previously, in response to or in synchronization with a synchronization signal 120B inputted from outside, for example.

The picture signal processing circuit 122 performs a predetermined correction on the picture signal 120A inputted from outside, and outputs a picture signal 122A following the correction to the signal line driving circuit 123. The predetermined correction can be such as a gamma correction, an overdrive correction, and other suitable correction scheme.

The signal line driving circuit 123 applies the picture signal 122A supplied from the picture signal processing circuit 122 to each of the signal lines DTL, in response to or in synchronization with the input of the control signal 121A, to thereby write the same into the pixels 113 subjected to selection. The term such as "write" as used herein refers to application of a predetermined voltage to the gate of the drive transistor T100.

The signal line driving circuit 123 may include an unillustrated shift register, and may be provided with an unillustrated buffer circuit for each stage corresponding to each column of the pixels 113, for example. The signal line driving circuit 123 may be capable of outputting two kinds of voltages (for example, Vofs and Vsig) to each of the signal lines DTL, in response to or in synchronization with the control signal 121A. More specifically, the signal line driving circuit 123 may supply, in order, two kinds of voltages (for example, Vofs and Vsig) to the pixels 113 selected by the write line driving circuit 124 through the signal lines DTL connected to the respective pixels 113.

The offset voltage Vofs has a constant voltage value irrespective of a value of the signal voltage Vsig. The signal voltage Vsig has a voltage value corresponding to the picture signal 122A. A minimum voltage of the signal voltage Vsig has a voltage value lower than that of the offset voltage Vofs, and a maximum voltage of the signal voltage Vsig has a voltage value higher than that of the offset voltage Vofs.

The write line driving circuit 124 may be configured by an unillustrated shift register, and may be provided with a buffer circuit 2 for each stage corresponding to each row of the pixels 113, for example. The buffer circuit 2 includes one or more inverter circuits 1 described above, and outputs from an output end a pulse signal having substantially the same phase as a phase of a pulse signal supplied to an input end. The write line driving circuit 124 may be capable of outputting two kinds of voltages (for example, Vdd and Vss) to each of the write lines WSL, in response to or in synchronization with the control signal 121A. More specifically, the write line driving circuit 124 may supply two kinds of voltages (for example, Vdd and Vss) to the pixels 113 subjected to driving through the write lines WSL connected to the respective pixels 113, to thereby control the write transistor T200. For example, when a clock ck and a scan pulse sp are supplied as the control signal 121A, the write line driving circuit 124 outputs, in order, voltages Vs(i) (where $1 \leq i \leq N$, and where i and N are each a positive integer), each including a pulse whose crest value is Vdd and whose width is 2H, to the plurality of write lines WSL, respectively, while shifting phases of the pulses by 1H as illustrated in FIG. 28.

The voltage Vdd is at a value equal to or higher than an on-voltage of the write transistor T200. The voltage Vdd has a voltage value that is outputted from the write line driving circuit 124 when performing such as a threshold correction, a mobility correction, and a light-emitting operation, for example. The voltage Vss is at a value lower than the on-voltage of the write transistor T200 and lower than the voltage Vdd.

The power line driving circuit 125 may include an unillustrated shift register, and may be provided with an unillustrated buffer circuit for each stage corresponding to each row of the pixels 113, for example. The power line driving circuit 125 may be capable of outputting two kinds of voltages (for example, VccH and VccL), in response to or in synchronization with the control signal 121A. More specifically, the power line driving circuit 125 may supply two kinds of voltages (for example, VccH and VccL) to the pixels 113 subjected to driving through the power lines PSL connected to the respective pixels 113, to thereby control emission and quenching of light of the organic EL devices 111.

The voltage VccL has a voltage value lower than a sum of a threshold voltage of the organic EL device 111 and a voltage of a cathode of the organic EL device 111. The voltage VccH has a voltage value equal to or higher than the sum of the threshold voltage of the organic EL device 111 and the voltage of the cathode of the organic EL device 111.

In the display unit 100, the pixel circuit 112 in each of the pixels 113 is subjected to on and off control and a drive current is injected to the organic EL device 111 of each of the pixels 113, to allow a hole and an electron to be recombined to cause emission of light. The light is extracted to outside and an image is displayed in the display region 110A of the display panel 110 accordingly.

In the present application example, the buffer circuits 2 in the write line driving circuit 124 each include one or more inverter circuits 1. Thereby, the through current that flows in the buffer circuits 2 hardly presents, making it possible to suppress a power consumption of the buffer circuits 2.

Figure 29:
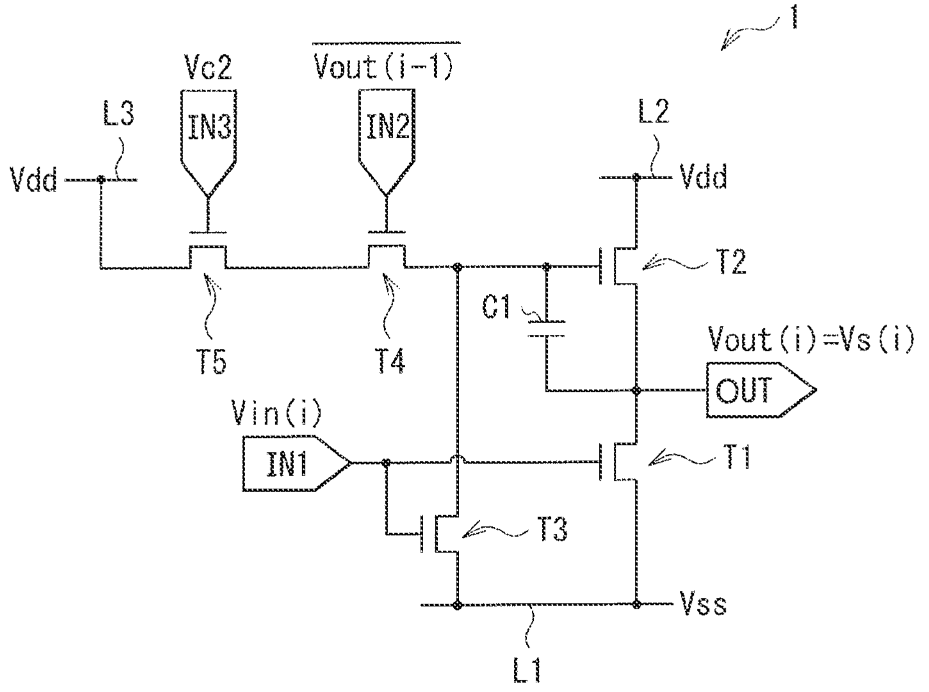
FIG. 29 is a circuit diagram illustrating an example of an inverter circuit included in the write line driving circuit in FIG. 26.
Figure 30:
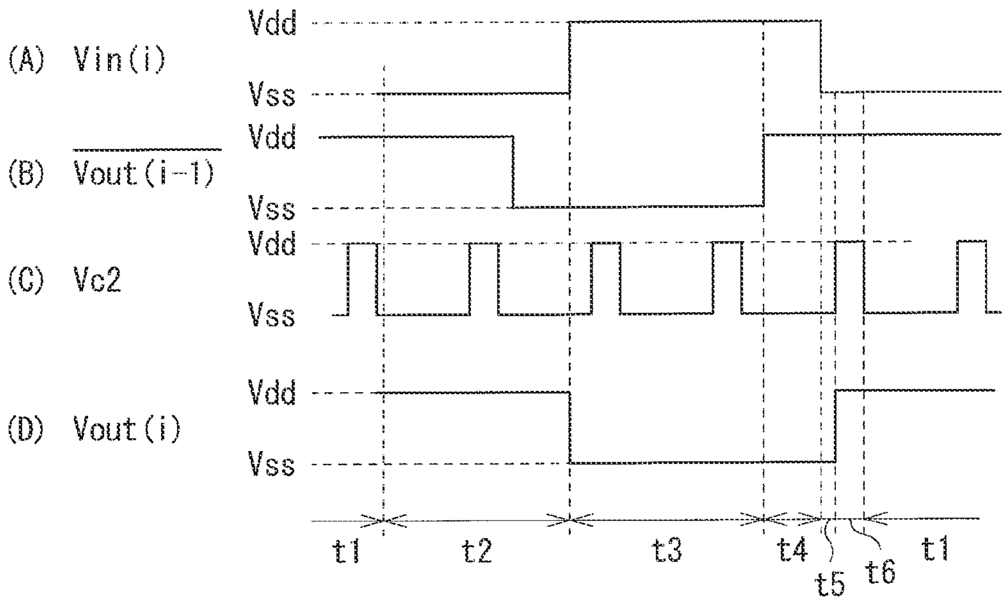
FIG. 30 is a waveform chart illustrating examples of waveforms of input and output signals in the inverter circuit in FIG. 29.

Also, in the present application example, the write line driving circuit 124 may so supply the control signal to the gate of the transistor T4 or to the gate of the transistor T5 as to allow the transistor T4 or the transistor T5 to be turned off for a time period equal to a time period during which the voltage of the input terminal IN1 is continuously at a high level. In this embodiment, the write line driving circuit 124 may output to the write lines WSL a signal outputted from the output terminal OUT of the inverter circuit 1 provided for each of the write lines WSL (for example, an output voltage Vout(i)=Vs(i)), or may output a signal equivalent thereto, as illustrated in FIGS. 29 and 30, for example. Further, the write line driving circuit 124 may supply an inverted signal, which is the inversion of a signal outputted from the output terminal OUT of the inverter circuit 1 provided corresponding to the "i−1"th write line WSL (for example, an output voltage Vout(i−1)), or a signal equivalent thereto, to the gate of the transistor T4 included in the inverter circuit 1 provided corresponding to the i-th write line WSL (where i is a positive integer). It is to be noted that, although unillustrated, the write line driving circuit 124 may be configured to supply the inverted signal mentioned above to the gate of the transistor T5 included in the inverter circuit 1 provided corresponding to the i-th write line WSL.

In this case, a circuit by which a control signal supplied to the gate of the transistor T4 or the gate of the transistor T5 is generated does not have to be provided separately, making it possible to simplify a circuit configuration of the display device 100. It is to be noted that the circuit described above with reference to FIG. 13 or 14 may be used instead of the circuit described above with reference to FIG. 29, in supplying the inverted signal mentioned above to the gate of the transistor T4 or the gate of the transistor T5 included in the inverter circuit 1 provided corresponding to the i-th write line WSL.

Alternatively, in the present application example, the write line driving circuit 124 may output to the write lines WSL a signal outputted from the output terminal OUT of the inverter circuit 1 provided for each of the write lines WSL (for example, an output voltage Vout(i)=Vs(i)), or may output a signal equivalent thereto, as illustrated in FIGS. 29 and 30, for example. Further, the write line driving circuit 124 may supply an inverted signal, which is the inversion of a signal outputted from the output terminal OUT of the inverter circuit 1 provided corresponding to the "i−1"th write line WSL (for example, an output voltage Vout(i−1)), or a signal equivalent thereto, to the input terminal IN2 (where i is a positive integer).

Figure 31:
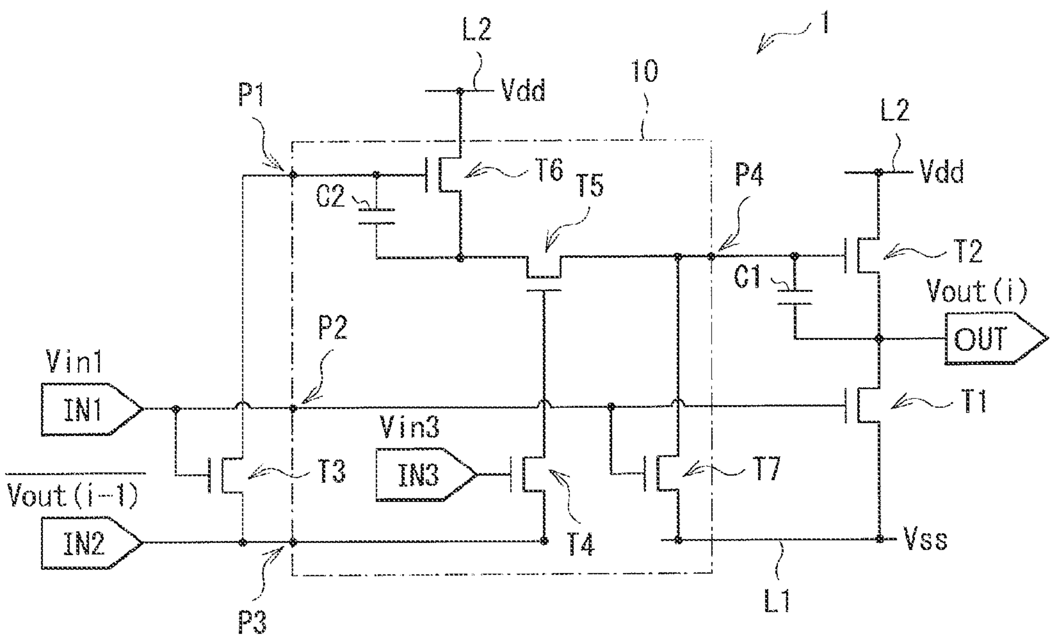
FIG. 31 is a circuit diagram illustrating another example of the inverter circuit included in the write line driving circuit in FIG. 26.

According to this embodiment, a circuit by which a control signal supplied to the input terminal IN2 is generated does not have to be provided separately, making it possible to simplify a circuit configuration of the display device 100. It is to be noted that a circuit in which the capacitor C3 is omitted and the high voltage line L3 is replaced by the high voltage line L2 may be used as the inverter circuit 1 for each of the write lines WSL, as illustrated in FIG. 31.

Although the technology has been described in the foregoing by way of example with reference to the embodiments, the modifications, and the application examples, the technology is not limited thereto but may be modified in a wide variety of ways.

For example, in the application example described above, the inverter circuit 1 according to any one of the embodiments and the modifications described above is used in an output stage of the write line driving circuit 124. Alternatively, such inverter circuit 1 may be used in an output stage of the power line driving circuit 125 instead of being used in the output stage of the write line driving circuit 124, or may be used in the output stage of the power line driving circuit 125 as well as in the output stage of the write line driving circuit 124.

In one embodiment where the inverter circuit 1 according to any one of the embodiments and the modifications described above is used in the output stage of the power line driving circuit 125, an unillustrated power source may be connected by which the voltage VccL is outputted to the low voltage line L1, an unillustrated power source may be connected by which the voltage VccH is outputted to the high voltage lines L2 and L3, and an unillustrated power source may be connected by which the voltage higher than the voltage VccH is outputted to the high voltage line L4, for example.

Alternatively, in one embodiment where the inverter circuit 1 according to any one of the embodiments and the modifications described above is used in the output stage of the power line driving circuit 125, an unillustrated power source may be connected by which the voltage VccL is outputted to the low voltage line L1, an unillustrated power source may be connected by which the voltage VccH is outputted to the high voltage line L2, and an unillustrated power source may be connected by which a voltage defined by VccH+Vth5 is outputted to the high voltage line L3, for example.

Accordingly, it is possible to achieve at least the following configurations (1) to (27) from the above-described exemplary embodiments, the modifications, and the application examples of the disclosure.

(1) An inverter circuit, including:

a first transistor, a second transistor, a third transistor, a fourth transistor, and a fifth transistor;

an input terminal and an output terminal; and a capacitor, wherein the first transistor makes and breaks electrical connection between the output terminal and a first voltage line, in response to a potential difference between the input terminal and the first voltage line or to an equivalent thereto, the second transistor makes and breaks electrical connection between a second voltage line and the output terminal, in response to a potential difference between a source or a drain of the fourth transistor and the output terminal or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a first control signal inputted to a gate of the fourth transistor, the fifth transistor makes and breaks electrical connection between a fourth voltage line and the first terminal, in response to a second control signal inputted to a gate of the fifth transistor, and the capacitor is inserted between the gate of the second transistor and one of a source and a drain of the second transistor, the one being located on an output terminal side.

(2) An inverter circuit, including:

a first transistor, a second transistor, a third transistor, a fourth transistor, and a fifth transistor;

a first input terminal, a second input terminal, a third input terminal, and an output terminal; and a capacitor, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to a source or a drain of the fourth transistor, one of the source and the drain is connected to a second voltage line, and the other of the source and the drain is connected to the output terminal, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, and the capacitor is inserted between the gate of the second transistor and one of the source and the drain of the second transistor, the one being unconnected to the second voltage line.

(3) An inverter circuit, including:

a first transistor, a second transistor, a third transistor, a fourth transistor, a fifth transistor, a sixth transistor, and a seventh transistor;

an input terminal and an output terminal; and a capacitor, wherein the first transistor makes and breaks electrical connection between a gate of the seventh transistor and a first voltage line, in response to a potential difference between the input terminal and the first voltage line or to an equivalent thereto, the second transistor makes and breaks electrical connection between a second voltage line and the gate of the seventh transistor, in response to a potential difference between a source or a drain of the fourth transistor and the gate of the seventh transistor or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a control signal inputted to a gate of the fourth transistor, the fifth transistor makes and breaks electrical connection between a fourth voltage line and the first terminal, in response to a control signal inputted to a gate of the fifth transistor, the sixth transistor makes and breaks electrical connection between the output terminal and a fifth voltage line, in response to a potential difference between the input terminal and the fifth voltage line or to an equivalent thereto, the seventh transistor makes and breaks electrical connection between a sixth voltage line and the output terminal, in response to a potential difference between the gate of the seventh transistor and the output terminal or to an equivalent thereto, and the capacitor is inserted between the gate of the second transistor and one of a source and a drain of the second transistor, the one being located on an output terminal side.

(4) An inverter circuit, including:

a first transistor, a second transistor, a third transistor, a fourth transistor, a fifth transistor, a sixth transistor, and a seventh transistor;

a first input terminal, a second input terminal, a third input terminal, and an output terminal; and a capacitor, wherein the first transistor has a gate, a source, and a drain in which the gate is connected to the first input terminal, one of the source and the drain is connected to a first voltage line, and the other of the source and the drain is connected to a gate of the seventh transistor, the second transistor has a gate, a source, and a drain in which the gate is connected to a source or a drain of the fourth transistor, one of the source and the drain is connected to a second voltage line, and the other of the source and the drain is connected to the gate of the seventh transistor, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, the sixth transistor has as a gate, a source, and a drain in which the gate is connected to the first input terminal, one of the source and the drain is connected to a fifth voltage line, and the other of the source and the drain is connected to the output terminal, the seventh transistor has the gate, a source, and a drain in which the gate is connected to one of the source and the drain of the second transistor, the one being unconnected to the second voltage line, one of the source and the drain is connected to a sixth voltage line, and the other of the source and the drain is connected to the output terminal, and the capacitor is inserted between the gate of the second transistor and one of the source and the drain of the second transistor, the one being unconnected to the second voltage line.

(5) The inverter circuit according to any one of (1) to (4), wherein the first voltage line and the third voltage line have a same potential.

(6) The inverter circuit according to (5), wherein the second voltage line and the fourth voltage line have a same potential.

(7) The inverter circuit according to (6), wherein the second voltage line and the fourth voltage are each connected to a power source outputting a voltage higher than that of each of the first voltage line and the third voltage line.

(8) The inverter circuit according to (5), wherein an on-resistance of the first transistor is lower than an on-resistance of the second transistor.

(9) A display unit, including:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, and a fifth transistor, a first input terminal and an output terminal, and a capacitor, wherein the first transistor makes and breaks electrical connection between the output terminal and a first voltage line, in response to a potential difference between the first input terminal and the first voltage line or to an equivalent thereto, the second transistor makes and breaks electrical connection between a second voltage line and the output terminal, in response to a potential difference between a source or a drain of the fourth transistor and the output terminal or to an equivalent thereto, the third transistor makes and breaks electrical connection between a gate of the second transistor and a third voltage line, in response to a potential difference between the first input terminal and the third voltage line or to an equivalent thereto, the fourth transistor makes and breaks electrical connection between a first terminal equivalent to a source or a drain of the fifth transistor and the gate of the second transistor, in response to a first control signal inputted to a gate of the fourth transistor, the fifth transistor makes and breaks electrical connection between a fourth voltage line and the first terminal, in response to a second control signal inputted to a gate of the fifth transistor, and the capacitor is inserted between the gate of the second transistor and one of a source and a drain of the second transistor, the one being located on an output terminal side.

(10) A display unit, including:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, and a fifth transistor, a first input terminal, a second input terminal, a third input terminal, and an output terminal, and a capacitor, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to a source or a drain of the fourth transistor, one of the source and the drain is connected to a second voltage line, and the other of the source and the drain is connected to the output terminal, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, and the capacitor is inserted between the gate of the second transistor and one of the source and the drain of the second transistor, the one being unconnected to the second voltage line.

(11) A display unit, including:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, a fifth transistor, a sixth transistor, and a seventh transistor, a first input terminal and an output terminal, and a capacitor, wherein the first transistor makes and breaks electrical connection between a gate of the seventh transistor and a first voltage line, in response to a potential difference between the first input terminal and the first voltage line or to an equivalent thereto, the second transistor makes and breaks electrical connection between a second voltage line and the gate of the seventh transistor, in response to a potential difference between a source or a drain of the fourth transistor and the gate of the seventh transistor or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a control signal inputted to a gate of the fourth transistor, the fifth transistor makes and breaks electrical connection between a fourth voltage line and the first terminal, in response to a control signal inputted to a gate of the fifth transistor, the sixth transistor makes and breaks electrical connection between the output terminal and a fifth voltage line, in response to a potential difference between the first input terminal and the fifth voltage line or to an equivalent thereto, the seventh transistor makes and breaks electrical connection between a sixth voltage line and the output terminal, in response to a potential difference between the gate of the seventh transistor and the output terminal or to an equivalent thereto, and the capacitor is inserted between the gate of the second transistor and one of a source and a drain of the second transistor, the one being located on an output terminal side.

(12) A display unit, including:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, a fifth transistor, a sixth transistor, and a seventh transistor, a first input terminal, a second input terminal, a third input terminal, and an output terminal, and a capacitor, wherein the first transistor has a gate, a source, and a drain in which the gate is connected to the first input terminal, one of the source and the drain is connected to a first voltage line, and the other of the source and the drain is connected to a gate of the seventh transistor, the second transistor has a gate, a source, and a drain in which the gate is connected to a source or a drain of the fourth transistor, one of the source and the drain is connected to a second voltage line, and the other of the source and the drain is connected to the gate of the seventh transistor, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, the sixth transistor has as a gate, a source, and a drain in which the gate is connected to the first input terminal, one of the source and the drain is connected to a fifth voltage line, and the other of the source and the drain is connected to the output terminal, the seventh transistor has the gate, a source, and a drain in which the gate is connected to one of the source and the drain of the second transistor, the one being unconnected to the second voltage line, one of the source and the drain is connected to a sixth voltage line, and the other of the source and the drain is connected to the output terminal, and the capacitor is inserted between the gate of the second transistor and one of the source and the drain of the second transistor, the one being unconnected to the second voltage line.

(13) The display unit according to any one of (9) to (12), wherein the drive section allows the fourth transistor and the fifth transistor to fail to stay turned-on together during a time period from rising timing up to falling timing of a voltage of the first input terminal, and allows the fourth transistor and the fifth transistor to stay turned-on after the falling timing of the voltage of the first input terminal.

(14) The display unit according to any one of (9) to (12), wherein the drive section allows the fourth transistor and the fifth transistor to fail to stay turned-on together during a time period from rising timing up to falling timing or up to a timing immediately before the falling timing of a voltage of the first input terminal, and allows the fourth transistor and the fifth transistor to stay turned-on at the falling timing or at the timing immediately before the falling timing of the voltage of the first input terminal.

(15) The display unit according to any one of (9) to (12), wherein the drive section allows one of the fourth transistor and the fifth transistor to turn on and off with a period shorter than a time period during which a voltage of the first input terminal continuously stays at a high level, and allows the other of the fourth transistor and the fifth transistor to turn off for a time period longer than the time period during which the voltage of the first input terminal continuously stays at the high level.

(16) The display unit according to any one of (9) to (12), wherein the drive section allows one of the fourth transistor and the fifth transistor to turn on and off with a period shorter than a time period during which a voltage of the first input terminal continuously stays at a high level, and allows the other of the fourth transistor and the fifth transistor to turn off for a time period substantially equal to the time period during which the voltage of the first input terminal continuously stays at the high level.

(17) The display unit according to (16), wherein the drive section allows a signal outputted from the output terminal of the one or more inverter circuits, or an equivalent signal thereto, to be supplied to the corresponding scan line, and the drive section allows an inverted signal to be supplied to the gate of the fourth transistor or the gate of the fifth transistor of the one or more inverter circuits provided corresponding to an i-th scan line of the scan lines, where the inverted signal is inversion of a signal outputted from the output terminal of the one or more inverter circuits provided corresponding to an "i−1"th scan line of the scan lines, or an equivalent signal thereto, and where i is a positive integer.

(18) An inverter circuit, including:

a first transistor, a second transistor, and a third transistor;

a first input terminal, a second input terminal, and a first output terminal;

a first capacitor; and a control device including a third input terminal, a fourth input terminal, and a second output terminal, wherein the first transistor makes and breaks electrical connection between the first output terminal and a first voltage line, in response to a potential difference between the first input terminal and the first voltage line or to an equivalent thereto, the second transistor makes and breaks electrical connection between a second voltage line and the output terminal, in response to a potential difference between the second output terminal and the first output terminal or to an equivalent thereto, the third transistor makes and breaks electrical connection between the second input terminal and the fourth input terminal, in response to a potential difference between the first input terminal and the second input terminal or to an equivalent thereto, the first capacitor is inserted between a gate of the second transistor and one of a source and a drain of the second transistor, the one being located on a first output terminal side, and the control device outputs, from the second output terminal, a voltage which allows the second transistor to turn on, only when the third input terminal stays at a high level during a time period in which both the first input terminal and the second input terminal stay at a high level.

(19) The inverter circuit according to (18), wherein the control device includes a fourth transistor, a fifth transistor, a sixth transistor, a seventh transistor, and a second capacitor device, the fourth transistor makes and breaks electrical connection between a gate of the fifth transistor and the second input terminal, based on a signal inputted to a gate of the fourth transistor through the third input terminal, the fifth transistor makes and breaks electrical connection between a first terminal equivalent to a source or a drain of the sixth transistor and the second output terminal, based on a signal inputted to a gate of the fifth transistor through the fourth transistor, the sixth transistor makes and breaks electrical connection between a third voltage line and the first terminal, in response to a potential difference between the fourth input terminal and the first terminal or to an equivalent thereto, the seventh transistor makes and breaks electrical connection between the second output terminal and a fourth voltage line, in response to a potential difference between the first input terminal and the fourth voltage line or to an equivalent thereto, and the second capacitor device is inserted between a gate of the sixth transistor and the first terminal.

(20) An inverter circuit, including:

a first transistor, a second transistor, and a third transistor;

a first input terminal, a second input terminal, and a first output terminal;

a first capacitor; and a control device including a third input terminal, a fourth input terminal, and a second output terminal, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to the second output terminal, one of the source and the drain is connected to a second voltage line, and the other of the source and the drain is connected to the output terminal, the third transistor has a gate, a source, and a drain in which the gate is connected to the first input terminal, one of the source and the drain is connected to the second input terminal, and the other of the source and the drain is connected to the third input terminal, the first capacitor is inserted between a gate of a fifth transistor and one of a source and a drain of the fifth transistor, the one being unconnected to a third voltage line, the fourth input terminal in the control device is connected to one of the source and the drain of the third transistor, the one being unconnected to the second input terminal, and the second output terminal in the control device is connected to the gate of the second transistor, and the control device outputs, from the second output terminal, a voltage which allows the second transistor to turn on, only when the third input terminal stays at a high level during a time period in which both the first input terminal and the second input terminal stay at a high level.

(21) The inverter circuit according to (20), wherein the control device includes a fourth transistor, a fifth transistor, a sixth transistor, a seventh transistor, and a second capacitor, the fourth transistor has a gate, a source, and a drain in which the gate is connected to the third input terminal, one of the source and the drain is connected to the second input terminal, and the other of the source and the drain is connected to the gate of the fifth transistor, the fifth transistor has the gate, the source, and the drain in which the gate is connected to one of the source and the drain of the fourth transistor, the one being unconnected to the second input terminal, one of the source and the drain is connected to a first terminal, and the other of the source and the drain is connected to the second output terminal, the sixth transistor has a gate, a source, and a drain, the source or the drain being equivalent to the first terminal, in which the gate is connected to the fourth input terminal, the first terminal is connected to one of the source and the drain of the fifth transistor, the one being unconnected to the gate of the second transistor, and one of the source and the drain of the sixth transistor different from the first terminal is connected to the third voltage line, the seventh transistor has a gate, a source, and a drain in which the gate is connected to the first input terminal, one of the source and the drain is connected to a fourth voltage line, and the other of the source and the drain is connected to the second output terminal, and the second capacitor is inserted between the gate of the sixth transistor and the first terminal.

(22) A display unit, including:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, and a third transistor, a first input terminal, a second input terminal, and a first output terminal, a first capacitor, and a control device including a third input terminal, a fourth input terminal, and a second output terminal, wherein the first transistor makes and breaks electrical connection between the first output terminal and a first voltage line, in response to a potential difference between the first input terminal and the first voltage line or to an equivalent thereto, the second transistor makes and breaks electrical connection between a second voltage line and the output terminal, in response to a potential difference between the second output terminal and the first output terminal or to an equivalent thereto, the third transistor makes and breaks electrical connection between the second input terminal and the fourth input terminal, in response to a potential difference between the first input terminal and the second input terminal or to an equivalent thereto, the first capacitor is inserted between a gate of the second transistor and one of a source and a drain of the second transistor, the one being located on a first output terminal side, and the control device outputs, from the second output terminal, a voltage which allows the second transistor to turn on, only when the third input terminal stays at a high level during a time period in which both the first input terminal and the second input terminal stay at a high level.

(23) The display unit according to (22), wherein the drive section outputs to the third input terminal a pulse which allows the second transistor to turn on during a first time period including a time point at which a voltage of the first input terminal falls, and outputs to the third input terminal a voltage which allows the second transistor to turn off in a time period out of the first time period during the time period in which both the first input terminal and the second input terminal stay at the high level.

(24) The display unit according to (22) or (23), wherein the control device includes a fourth transistor, a fifth transistor, a sixth transistor, a seventh transistor, and a second capacitor, the fourth transistor makes and breaks electrical connection between a gate of the fifth transistor and the second input terminal, based on a signal inputted to a gate of the fourth transistor through the third input terminal, the fifth transistor makes and breaks electrical connection between a first terminal equivalent to a source or a drain of the sixth transistor and the second output terminal, based on a signal inputted to a gate of the fifth transistor through the fourth transistor, the sixth transistor makes and breaks electrical connection between a third voltage line and the first terminal, in response to a potential difference between the fourth input terminal and the first terminal or to an equivalent thereto, the seventh transistor makes and breaks electrical connection between the second output terminal and a fourth voltage line, in response to a potential difference between the first input terminal and the fourth voltage line or to an equivalent thereto, and the second capacitor is inserted between a gate of the sixth transistor and the first terminal.

(25) A display unit, including:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, and a third transistor, a first input terminal, a second input terminal, and a first output terminal, a first capacitor, and a control device including a third input terminal, a fourth input terminal, and a second output terminal, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to the second output terminal, one of the source and the drain is connected to a second voltage line, and the other of the source and the drain is connected to the output terminal, the third transistor has a gate, a source, and a drain in which the gate is connected to the first input terminal, one of the source and the drain is connected to the second input terminal, and the other of the source and the drain is connected to the third input terminal, the first capacitor is inserted between a gate of a fifth transistor and one of a source and a drain of the fifth transistor, the one being unconnected to a third voltage line, the fourth input terminal in the control device is connected to one of the source and the drain of the third transistor, the one being unconnected to the second input terminal, and the second output terminal in the control device is connected to the gate of the second transistor, and the control device outputs, from the second output terminal, a voltage which allows the second transistor to turn on, only when the third input terminal stays at a high level during a time period in which both the first input terminal and the second input terminal stay at a high level.

(26) The display unit according to (25), wherein the drive section outputs to the third input terminal a pulse which allows the second transistor to turn on during a first time period including a time point at which the voltage of the first input terminal falls, and outputs to the third input terminal a voltage which allows the second transistor turn off in a time period out of the first time period during the time period in which both the first input terminal and the second input terminal stay at the high level.

(27) The display unit according to (25) or (26), wherein the control device includes a fourth transistor, a fifth transistor, a sixth transistor, a seventh transistor, and a second capacitor, the fourth transistor has a gate, a source, and a drain in which the gate is connected to the third input terminal, one of the source and the drain is connected to the second input terminal, and the other of the source and the drain is connected to the gate of the fifth transistor, the fifth transistor has the gate, the source, and the drain in which the gate is connected to one of the source and the drain of the fourth transistor, the one being unconnected to the second input terminal, one of the source and the drain is connected to a first terminal, and the other of the source and the drain is connected to the second output terminal, the sixth transistor has a gate, a source, and a drain, the source or the drain being equivalent to the first terminal, in which the gate is connected to the fourth input terminal, the first terminal is connected to one of the source and the drain of the fifth transistor, the one being unconnected to the gate of the second transistor, and one of the source and the drain of the sixth transistor different from the first terminal is connected to the third voltage line, the seventh transistor has a gate, a source, and a drain in which the gate is connected to the first input terminal, one of the source and the drain is connected to a fourth voltage line, and the other of the source and the drain is connected to the second output terminal, and the second capacitor is inserted between the gate of the sixth transistor and the first terminal.

The present disclosure contains subject matter related to that disclosed in Japanese Priority Patent Application JP 2011-48321 and that disclosed in Japanese Priority Patent Application JP 2011-48322 both filed in the Japan Patent Office on Mar. 4, 2011, the entire content of each of which is hereby incorporated by reference.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. An inverter circuit, comprising:

a first transistor, a second transistor, a third transistor, a fourth transistor, and a fifth transistor;

an input terminal and an output terminal; and a capacitor, wherein the first transistor makes and breaks electrical connection between the output terminal and a first voltage line, in response to a potential difference between the input terminal and the first voltage line or to an equivalent thereto, the second transistor makes and breaks electrical connection between a second voltage line and the output terminal, in response to a potential difference between a source or a drain of the fourth transistor and the output terminal or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a first control signal inputted to a gate of the fourth transistor, the fifth transistor makes and breaks electrical connection between a fourth voltage line and the first terminal, in response to a second control signal inputted to a gate of the fifth transistor, and the capacitor is inserted between the gate of the second transistor and one of a source and a drain of the second transistor, the one being located on an output terminal side.

2. An inverter circuit, comprising:

a first transistor, a second transistor, a third transistor, a fourth transistor, and a fifth transistor;

a first input terminal, a second input terminal, a third input terminal, and an output terminal; and a capacitor, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to a source or a drain of the fourth transistor, one of the source and the drain is connected to a second voltage line, and the other of the source and the drain is connected to the output terminal, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, and the capacitor is inserted between the gate of the second transistor and one of the source and the drain of the second transistor, the one being unconnected to the second voltage line.

3. An inverter circuit, comprising:

a first transistor, a second transistor, a third transistor, a fourth transistor, a fifth transistor, a sixth transistor, and a seventh transistor;

an input terminal and an output terminal; and a capacitor, wherein the first transistor makes and breaks electrical connection between a gate of the seventh transistor and a first voltage line, in response to a potential difference between the input terminal and the first voltage line or to an equivalent thereto, the second transistor makes and breaks electrical connection between a second voltage line and the gate of the seventh transistor, in response to a potential difference between a source or a drain of the fourth transistor and the gate of the seventh transistor or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a control signal inputted to a gate of the fourth transistor, the fifth transistor makes and breaks electrical connection between a fourth voltage line and the first terminal, in response to a control signal inputted to a gate of the fifth transistor, the sixth transistor makes and breaks electrical connection between the output terminal and a fifth voltage line, in response to a potential difference between the input terminal and the fifth voltage line or to an equivalent thereto, the seventh transistor makes and breaks electrical connection between a sixth voltage line and the output terminal, in response to a potential difference between the gate of the seventh transistor and the output terminal or to an equivalent thereto, and the capacitor is inserted between the gate of the second transistor and one of a source and a drain of the second transistor, the one being located on an output terminal side.

4. An inverter circuit, comprising:

a first transistor, a second transistor, a third transistor, a fourth transistor, a fifth transistor, a sixth transistor, and a seventh transistor;

a first input terminal, a second input terminal, a third input terminal, and an output terminal; and a capacitor, wherein the first transistor has a gate, a source, and a drain in which the gate is connected to the first input terminal, one of the source and the drain is connected to a first voltage line, and the other of the source and the drain is connected to a gate of the seventh transistor, the second transistor has a gate, a source, and a drain in which the gate is connected to a source or a drain of the fourth transistor, one of the source and the drain is connected to a second voltage line, and the other of the source and the drain is connected to the gate of the seventh transistor, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, the sixth transistor has as a gate, a source, and a drain in which the gate is connected to the first input terminal, one of the source and the drain is connected to a fifth voltage line, and the other of the source and the drain is connected to the output terminal, the seventh transistor has the gate, a source, and a drain in which the gate is connected to one of the source and the drain of the second transistor, the one being unconnected to the second voltage line, one of the source and the drain is connected to a sixth voltage line, and the other of the source and the drain is connected to the output terminal, and the capacitor is inserted between the gate of the second transistor and one of the source and the drain of the second transistor, the one being unconnected to the second voltage line.

5. The inverter circuit according to claim 1, wherein the first voltage line and the third voltage line have a same potential.

6. The inverter circuit according to claim 5, wherein the second voltage line and the fourth voltage line have a same potential.

7. The inverter circuit according to claim 6, wherein the second voltage line and the fourth voltage are each connected to a power source outputting a voltage higher than that of each of the first voltage line and the third voltage line.

8. The inverter circuit according to claim 5, wherein an on-resistance of the first transistor is lower than an on-resistance of the second transistor.

9. A display unit, comprising:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, and a fifth transistor, a first input terminal and an output terminal, and a capacitor, wherein the first transistor makes and breaks electrical connection between the output terminal and a first voltage line, in response to a potential difference between the first input terminal and the first voltage line or to an equivalent thereto, the second transistor makes and breaks electrical connection between a second voltage line and the output terminal, in response to a potential difference between a source or a drain of the fourth transistor and the output terminal or to an equivalent thereto, the third transistor makes and breaks electrical connection between a gate of the second transistor and a third voltage line, in response to a potential difference between the first input terminal and the third voltage line or to an equivalent thereto, the fourth transistor makes and breaks electrical connection between a first terminal equivalent to a source or a drain of the fifth transistor and the gate of the second transistor, in response to a first control signal inputted to a gate of the fourth transistor, the fifth transistor makes and breaks electrical connection between a fourth voltage line and the first terminal, in response to a second control signal inputted to a gate of the fifth transistor, and the capacitor is inserted between the gate of the second transistor and one of a source and a drain of the second transistor, the one being located on an output terminal side.

10. A display unit, comprising:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, and a fifth transistor, a first input terminal, a second input terminal, a third input terminal, and an output terminal, and a capacitor, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to a source or a drain of the fourth transistor, one of the source and the drain is connected to a second voltage line, and the other of the source and the drain is connected to the output terminal, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, and the capacitor is inserted between the gate of the second transistor and one of the source and the drain of the second transistor, the one being unconnected to the second voltage line.

11. A display unit, comprising:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, a fifth transistor, a sixth transistor, and a seventh transistor, a first input terminal and an output terminal, and a capacitor, wherein the first transistor makes and breaks electrical connection between a gate of the seventh transistor and a first voltage line, in response to a potential difference between the first input terminal and the first voltage line or to an equivalent thereto, the second transistor makes and breaks electrical connection between a second voltage line and the gate of the seventh transistor, in response to a potential difference between a source or a drain of the fourth transistor and the gate of the seventh transistor or to an equivalent thereto, the third transistor makes and breaks electrical connection between a gate of the second transistor and a third voltage line, in response to a potential difference between the input terminal and the third voltage line or to an equivalent thereto, the fourth transistor makes and breaks electrical connection between a first terminal equivalent to a source or a drain of the fifth transistor and the gate of the second transistor, in response to a control signal inputted to a gate of the fourth transistor, the fifth transistor makes and breaks electrical connection between a fourth voltage line and the first terminal, in response to a control signal inputted to a gate of the fifth transistor, the sixth transistor makes and breaks electrical connection between the output terminal and a fifth voltage line, in response to a potential difference between the first input terminal and the fifth voltage line or to an equivalent thereto, the seventh transistor makes and breaks electrical connection between a sixth voltage line and the output terminal, in response to a potential difference between the gate of the seventh transistor and the output terminal or to an equivalent thereto, and the capacitor is inserted between the gate of the second transistor and one of a source and a drain of the second transistor, the one being located on an output terminal side.

12. A display unit, comprising:

a display section including a plurality of scan lines arranged in rows, a plurality of signal lines arranged in columns, and a plurality of pixels arranged in matrix; and a drive section having one or more inverter circuits provided for each of the scan lines, the drive section driving each of the pixels, the one or more inverter circuits including a first transistor, a second transistor, a third transistor, a fourth transistor, a fifth transistor, a sixth transistor, and a seventh transistor, a first input terminal, a second input terminal, a third input terminal, and an output terminal, and a capacitor, wherein the first transistor has a gate, a source, and a drain in which the gate is connected to the first input terminal, one of the source and the drain is connected to a first voltage line, and the other of the source and the drain is connected to a gate of the seventh transistor, the second transistor has a gate, a source, and a drain in which the gate is connected to a source or a drain of the fourth transistor, one of the source and the drain is connected to a second voltage line, and the other of the source and the drain is connected to the gate of the seventh transistor, the third transistor has a gate, a source, and a drain in which the gate is connected to the first input terminal, one of the source and the drain is connected to a third voltage line, and the other of the source and the drain is connected to the gate of the second transistor, the fourth transistor has a gate, the source, and the drain in which the gate is connected to the second input terminal, one of the source and the drain is connected to the gate of the second transistor, and the other of the source and the drain is connected to a source or a drain of the fifth transistor, the fifth transistor has a gate, the source, and the drain in which the gate is connected to the third input terminal, one of the source and the drain is connected to a fourth voltage line, and the other of the source and the drain is connected to one of the source and the drain of the fourth transistor, the one being unconnected to the gate of the second transistor, the sixth transistor has as a gate, a source, and a drain in which the gate is connected to the first input terminal, one of the source and the drain is connected to a fifth voltage line, and the other of the source and the drain is connected to the output terminal, the seventh transistor has the gate, a source, and a drain in which the gate is connected to one of the source and the drain of the second transistor, the one being unconnected to the second voltage line, one of the source and the drain is connected to a sixth voltage line, and the other of the source and the drain is connected to the output terminal, and the capacitor is inserted between the gate of the second transistor and one of the source and the drain of the second transistor, the one being unconnected to the second voltage line.

13. The display unit according to claim 9, wherein the drive section allows the fourth transistor and the fifth transistor to fail to stay turned-on together during a time period from rising timing up to falling timing of a voltage of the first input terminal, and allows the fourth transistor and the fifth transistor to stay turned-on after the falling timing of the voltage of the first input terminal.

14. The display unit according to claim 9, wherein the drive section allows the fourth transistor and the fifth transistor to fail to stay turned-on together during a time period from rising timing up to falling timing or up to a timing immediately before the falling timing of a voltage of the first input terminal, and allows the fourth transistor and the fifth transistor to stay turned-on at the falling timing or at the timing immediately before the falling timing of the voltage of the first input terminal.

15. The display unit according to claim 9, wherein the drive section allows one of the fourth transistor and the fifth transistor to turn on and off with a period shorter than a time period during which a voltage of the first input terminal continuously stays at a high level, and allows the other of the fourth transistor and the fifth transistor to turn off for a time period longer than the time period during which the voltage of the first input terminal continuously stays at the high level.

16. The display unit according to claim 9, wherein the drive section allows one of the fourth transistor and the fifth transistor to turn on and off with a period shorter than a time period during which a voltage of the first input terminal continuously stays at a high level, and allows the other of the fourth transistor and the fifth transistor to turn off for a time period substantially equal to the time period during which the voltage of the first input terminal continuously stays at the high level.

17. The display unit according to claim 16, wherein the drive section allows a signal outputted from the output terminal of the one or more inverter circuits, or an equivalent signal thereto, to be supplied to the corresponding scan line, and the drive section allows an inverted signal to be supplied to the gate of the fourth transistor or the gate of the fifth transistor of the one or more inverter circuits provided corresponding to an i-th scan line of the scan lines, where the inverted signal is inversion of a signal outputted from the output terminal of the one or more inverter circuits provided corresponding to an "i−1"th scan line of the scan lines, or an equivalent signal thereto, and where i is a positive integer.

18. An inverter circuit, comprising:

a first transistor, a second transistor, and a third transistor;

a first input terminal, a second input terminal, and a first output terminal;

a first capacitor; and a control device including a third input terminal, a fourth input terminal, and a second output terminal, wherein the first transistor makes and breaks electrical connection between the first output terminal and a first voltage line, in response to a potential difference between the first input terminal and the first voltage line or to an equivalent thereto, the second transistor makes and breaks electrical connection between a second voltage line and the output terminal, in response to a potential difference between the second output terminal and the first output terminal or to an equivalent thereto, the third transistor makes and breaks electrical connection between the second input terminal and the fourth input terminal, in response to a potential difference between the first input terminal and the second input terminal or to an equivalent thereto, the first capacitor is inserted between a gate of the second transistor and one of a source and a drain of the second transistor, the one being located on a first output terminal side, and the control device outputs, from the second output terminal, a voltage which allows the second transistor to turn on, only when the third input terminal stays at a high level during a time period in which both the first input terminal and the second input terminal stay at a high level.

19. An inverter circuit, comprising:

a first transistor, a second transistor, and a third transistor;

a first input terminal, a second input terminal, and a first output terminal;

a first capacitor; and a control device including a third input terminal, a fourth input terminal, and a second output terminal, wherein the first transistor has a gate, a source, and a drain in which the gate is connected to the first input terminal, one of the source and the drain is connected to a first voltage line, and the other of the source and the drain is connected to the output terminal, the second transistor has a gate, a source, and a drain in which the gate is connected to the second output terminal, one of the source and the drain is connected to a second voltage line, and the other of the source and the drain is connected to the output terminal, the third transistor has a gate, a source, and a drain in which the gate is connected to the first input terminal, one of the source and the drain is connected to the second input terminal, and the other of the source and the drain is connected to the third input terminal, the first capacitor is inserted between a gate of a fifth transistor and one of a source and a drain of the fifth transistor, the one being unconnected to a third voltage line, the fourth input terminal in the control device is connected to one of the source and the drain of the third transistor, the one being unconnected to the second input terminal, and the second output terminal in the control device is connected to the gate of the second transistor, and the control device outputs, from the second output terminal, a voltage which allows the second transistor to turn on, only when the third input terminal stays at a high level during a time period in which both the first input terminal and the second input terminal stay at a high level.

* * * * *